(12) United States Patent
Madhavan et al.

(10) Patent No.: US 9,418,185 B2
(45) Date of Patent: Aug. 16, 2016

(54) THERMAL MODELING OF AN ORTHOGONAL MACHINING PROCESS

(76) Inventors: Viswanathan Madhavan, Wichita, KS (US); Amit Deshpande, Wichita, KS (US)

( * ) Notice: Subject to any disclaimer, the term of this patent is extended or adjusted under 35 U.S.C. 154(b) by 841 days.

(21) Appl. No.: 12/653,908

(22) Filed: Dec. 21, 2009

(65) Prior Publication Data

US 2010/0174515 A1 Jul. 8, 2010

Related U.S. Application Data

(60) Provisional application No. 61/139,321, filed on Dec. 19, 2008.

(51) Int. Cl.
*G06F 7/60* (2006.01)
*G06F 17/50* (2006.01)

(52) U.S. Cl.
CPC ........ *G06F 17/5018* (2013.01); *G06F 2217/16* (2013.01); *G06F 2217/80* (2013.01)

(58) Field of Classification Search
CPC ... G06F 7/60; G06F 17/5018; G06F 2217/16; G06F 2217/80
USPC .......................................................... 703/2
See application file for complete search history.

(56) References Cited

U.S. PATENT DOCUMENTS

| | | |
|---|---|---|
| 4,259,859 A | 4/1981 | Iida |
| 5,377,116 A | 12/1994 | Wayne |
| 5,424,962 A | 6/1995 | Bouchez |
| 6,731,996 B1 | 5/2004 | Macewen |
| 7,010,474 B1 | 3/2006 | Wang |

FOREIGN PATENT DOCUMENTS

| | | |
|---|---|---|
| EP | 1456783 | 9/2004 |
| WO | WO 2007-070879 A1 | 6/2007 |

OTHER PUBLICATIONS

Yigit Karpat and Tugrul Özel, Analytical and Thermal Modeling of High-Speed Machining With Chamfered Tools, Feb. 2008, Journal of Manufacturing Science and Engineering, vol. 130, pp. 1-15.*
Potdar et Al., Measurements and simulations of temperature and Deformation Fields in Transient Metal Cutting, Nov. 2003, Journal of Manufacturing Science and Engineering, vol. 125, pp. 645-655.*
Rui Li and Albert J. Shih, Tool Temperature in Titanium Drilling, Aug. 2007, Journal of Manufacturing Science and Engineering, vol. 129, pp. 740-749.*

(Continued)

*Primary Examiner* — Kamini S Shah
*Assistant Examiner* — Juan Ochoa
(74) *Attorney, Agent, or Firm* — Maier & Maier, PLLC

(57) ABSTRACT

A novel procedure is disclosed, that can be incorporated into Finite Element Analysis (FEA) or other similar analysis techniques, to obtain the steady state temperature distribution in a coupled transient heat transfer analysis rapidly as well as accurately. A scale factor is used to reduce the thermal inertia per unit volume (specific heat capacity) in regions of steady state temperature distribution, thereby hastening the achievement of steady state. An application of this procedure to estimate steady state temperature distributions within cutting tools, and the estimation of cutting tool wear based on the obtained steady state temperature distributions is shown as an example.

41 Claims, 16 Drawing Sheets

(56) References Cited

OTHER PUBLICATIONS

Karpat and Özel, "Predictive Analytical and Thermal Modeling of Orthogonal Cutting Process. Part I: Predictions of Tool Forces, Stresses and Temperature Distributions", 2006, ASME Journal of Manufacturing Science and Engineering, vol. 128/2, pp. 435-444.*
Tony A Asghari, Transient thermal analysis takes one-tenth the time, Feb. 7, 2002, Motorola Inc., pp. 1-3.*
Elmahi et al., A preconditioned dual time-stepping method for combustion problems, Mar. 2008, International Journal of Computational Fluid Dynamics, vol. 22, No. 3, pp. 169-181.*
Yen et al., Estimation of tool wear of carbide tool in orthogonal cutting using FEM simulation, 2004, Journal of Materials Processing Technology 146, pp. 82-91.*
Adibi-Sedeh, A. H. and Madhavan, V., "Investigation of Heat Partition in Machining Using Finite Element Analysis", NSF Workshop on Research Needs in Thermal Aspects of Material Removal Processes, Stillwater, Oklahoma, Jun. 10-12, 2003.
Carslaw, H.S. and Jaeger J.C., 1959, "Conduction of Heat in Solids", Oxford University Press.
Chandra, A. and Chan, C.L., 1990, "Thermal Aspects of Machining Processes and Their Design Sensitivities: A BEM Approach", ASME, v115, pp. 127-145.
Chow, J.G. and Wright, P.K., 1988, "On-line Estimation of the Tool/Chip Interface Temperatures for a Turning Operation", ASME, v110, pp. 56-64.
Chou, Y.K, Song, H., 2003. "Thermal Modeling for Finish Hard Turning Using a New Cutting Tool". ASME/IMECE, Manufacturing Science Engineering 1, paper No. IMECE-41765, pp. 1-10.
Elanayar, S., Shin, Y.C., 1996. "Modeling of Tool Forces for Worn Tools: Flank Wear Effects". Transactions of ASME, Journal of Manufacturing Science and Engineering. vol. 118, pp. 359-366.
Hahn, R.S., 1951, "On the Temperature Developed at the Shear Plane in the Metal Cutting Process", Proceedings of the First U.S. national Congress of Applied Mechanics, pp. 661-666.
Herbert, E.G., 1925, "The Measurement of Cutting Temperatures", The institution of mechanical engineers, pp. 289-329.
Huang, Y., Liang, S.Y., 2003. CBN tool wear modeling in finish hard turning. American Society of Mechanical Engineers, Manufacturing Engineering Division, MED, v 14, Proceedings of the ASME Manufacturing Engineering Division—2003, pp. 193-200.
Kannatey-Asibu, E., 1985. "Transport-diffusion equation in metal cutting and its application to analysis of the rate of flank wear", Journal of Engineering for Industry, Transactions ASME, v 107, n 1, pp. 81-89.
Komanduri, R. and Hou, Z.B., 2001, "Thermal Modeling of the Metal Cutting Process: Part I—Temperature Rise Distribution Due to Shear Plane Heat Source", International Journal of Mechanical Sciences, 42, pp. 1715-1752.
Kottenstette, J.P., 1986, "Measuring the Tool Chip Interface Temperatures", Journal of engineering for industry, v108, pp. 101-104.
Kwon, P., 2000, "Predictive Models for Flank Wear on Coated Inserts", ASME Journal of Tribology. vol. 122, pp. 340-347.
Leone, W.C., 1954, "Distribution of Shear Zone Heat in Metal Cutting", Trans. ASME, 76, pp. 121-125.
Loewen, E.G. and Shaw, M.C., 1954, "On the Analysis of Cutting Tool Temperature", Trans. ASME, 71, pp. 217-231.
Pednekar, V., Madhavan, V., Adibi, A. H., 2004, "Investigation of the Transition from Plane Strain to Plane Stress in Orthogonal Metal Cutting", ASME Mechanical Engineering Congress & Exposition, Anaheim, California.
Shi, T., Ramalingam, S., 1993. "Modeling Chip Formation with Grooved Tools.", International Journal of Mechanical Science. vol. 35, pp. 741-756.
Stevenson, M.G. and Oxley, P.L.B., 1970-1971, "An Experimental Investigation of Strain Rate and Temperature on the Flow Stress Properties of Low Carbon Steel Using a Machining test", Proc. Instn. Mech. Eng., 185, 55, pp. 741-754.
Stevenson, M.G., Wright, P.K. and Chow, J.G., 1982, "Further Developments in Applying the Finite Element Method to the Calculation of Temperature Distributions in Machining and Comparisons with Experiment", ASME, v105, pp. 149-154.
Strenkowski, J.S., Larson, W.C., 1993. "Tool flank wear in single point diamond turning",. NIST Special Publication, n 847, pp. 295-302.
Tay, A.O., Stevenson, M.G., Davis, G. De Vahl and Oxley, P.B., 1976, "A Numerical Method for Calculating Temperature Distributions in Machining, from Force and Shear Angle Measurements", Intl J Mach Tool Des, v16, pp. 335-349.
Trigger, K.J. and Chao, B.T., 1951, "An Analytical Evaluation of Metal Cutting Temperature", Trans. ASME, pp. 57-68.
Usui, E, Shirakashi, T., Katigawa, T, 1978, "Analytical Prediction of Three Dimensional Cutting Process", ASME, v100, pp. 236-243.
Weiner, J.H., 1955, "Shear Plane Temperature Distribution in Orthogonal Machining", Trans. ASME, 77, pp. 1331-1341.
Yen, Y.C., Sohner, J., Lilly, B., Altan, T., 2004, "Estimation of the Tool Wear in Orthogonal Cutting Using the Finite Element Analysis", Journal of Materials Processing Technology, v146, pp. 82-91.
Yoon, H.W., Davies, M.A., Burns, T.J. and Kennedy, M.D., 2000, "Calibrated Thermal Microscopy of the Tool-Chip Interface in Machining", Proceedings of SPIE, v4020, pp. 27-37.
Noskov, Mikhail 2003, "An Implicit Compact Scheme Solver for Modeling Steady-State and Time-Dependent Axisymmetric Flows With Application to Laminar Diffusion Flame Simulations", Ph.D. dissertation, Yale University, vol. 64/10-B of Dissertation Abstracts International, pp. 5178.
Yonghong Yang Changyun Zhu Gu, Z.P. Li Shang Dick, R.P. 2006, "Adaptive multi-domain thermal modeling and analysis for integrated circuit synthesis and design" ICCAD '06. IEEE/ACM International Conference, pp. 575-582.
Celo, D.; Gunupudi, P.K; Khazaka, R.; Walkey, D.J.; Smy, T.; Nakhla, M.S., 2005, "Fast Simulation of steady-state temperature distributions in electronic components using multidimensional model reduction", Components and Packaging Technologies, IEEE vol. 28, Issue 1, pp. 70-79.
Pu Liu Zhenyu Qi Hang Li Lingling Jin Wei Wu Tan, S.X.-D. Jun Yang, 2005, "Fast thermal simulation for architecture level dynamic thermal management", Computer-Aided Design, 2005. ICCAD-2005. IEEE/ACM International Conference pp. 639-644.
Tony A Asghari, 2002, "Transient thermal analysis takes one-tenth the time", http://www.edn.com/article/CA193189.html.

* cited by examiner

THERMAL MODELING OF AN ORTHOGONAL MACHINING PROCESS

CROSS-REFERENCE TO RELATED APPLICATIONS

The present patent application claims benefit and priority to U.S. Prov. Pat. Appl. No. 61/139,321 (EFS ID 4495067) entitled "Thermal modeling of an orthogonal machining process" and filed on Dec. 19, 2008 which is hereby incorporated by reference into the present disclosure.

BACKGROUND OF THE INVENTION

1. Technical Field

The subject matter includes a procedure that can be incorporated into Finite Element Analysis (FEA) or other similar analysis techniques, to obtain the steady state temperature distribution in a coupled transient heat transfer analysis rapidly as well as accurately.

2. Background Art

In 1971 Tay and Stevenson made use of the finite element method for evaluation of the temperature distribution along the chip tool interface. They carried out a heat transfer analysis with the actual geometry and size of the chip, workpiece and tool. The heat sources in both the primary and the secondary shear zone were calculated from the strain rate and strain distribution obtained experimentally, using an assumed flow stress model. They had used temperature dependent thermal properties. The strain rate and velocity distributions were adopted from Stevenson and Oxley's work, where an explosive quick-stop device was made use of to evaluate the deformation of a lithographically applied grid on the workpiece. The flow stress at a point was determined as a function of strain, strain rate and temperature. They observed that it was more difficult to get the velocity and strain rate distribution in the secondary shear zone region than in the primary shear zone region. This was attributed to the fact that in the secondary deformation region, there is very intense distortion in a very narrow region and also the printed grid itself is severely distorted in the primary shear zone before entering the secondary shear zone region. They computed the gradients of the velocity distribution to obtain the strain rates. To get the flow stress in the secondary shear zone region, they made use of the measured frictional force. The heat input everywhere was the product of the flow stress and the shear strain rate. In this way they obtained the temperature distribution in the regions of interest.

In their previous work, getting the velocity fields from the printed grid method and then applying it to the FEA model was a very laborious job and was prone to inaccuracies. Also, it required substantial computation time.

Yen et al. (2004) carried out a multi step finite element simulation using the DEFORM 2D FEA package. The first step of the analysis was the thermo-viscoplastic Lagrangian cutting simulation. The steady chip geometry was obtained in this first stage of analysis. In order to achieve the thermal steady state a second stage analysis which was a pure heat transfer analysis was carried out for the tool. The contact heat flux along the chip tool interface acted as the heat input. While the contact heat flux could be expected to decrease as the tool temperature increases, this was not taken into consideration. Thus the steady state tool temperatures were obtained at the end of second stage of the analysis. These results were used in the calculation of tool wear based on Usui's wear model, in the third stage of the analysis. The worn tool geometry obtained at the end of the third stage of the analysis was again used to carry out a fourth stage analysis, which was again a thermo-viscoplastic analysis. This loop of analyses was carried out in order to get the continuous tool wear.

The PhD work by Yaacov Krispin (1987) deals with finding steady state solutions for chemically reacting non-equilibrium flow fields. The steady state solution is difficult to obtain since the governing equations are very stiff. This leads to a very small timestep size as has been identified to be the problem in our current work also. However, in this PhD dissertation, the acceleration to the steady state solution (by almost 10×) has been achieved by replacing the source terms of the original system of equations (which are responsible for the stiffness) by approximate source terms. This is not only different compared to our approach of reducing the thermal inertia but also has the limitation that it can be applied only to thermochemical coupling. Our novel method can be applied to thermal phenomenon coupled with any other phenomenon.

In the 1996 work of Cheng et. al., a new and fast thermal reliability diagnosis tool (iTHREAD) for CMOS VLSI chips has been presented. It is claimed that this tool can not only obtain steady state temperature distribution but also the hot spots, as well as the resulting power consumptions. This work uses a fast timing simulator with accurate temperature-dependent device models and a novel 3-D analytical thermal simulator. The method described in this paper is analytical and doesn't involve finite element analysis. Another difference compared to our scaled specific heat approach is that the method in this paper can be used only for thermal analysis coupled with electrical analysis. Whereas, our scaled specific heat approach can used for thermal analysis coupled with any other phenomenon chemical or electrical with only the minor modification of choosing the scale factor appropriately based on the maximum time step size for accurate calculations of the other phenonmena.

Another work by Tony A Asghari of Motorola Inc. in 2002 claims to accelerate attainment of steady state thermal solutions. The approach used in this work is that, instead of running a full Computational-Fluid-Dynamics (CFD) analysis which involves solving for mass, momentum, and energy equations using finite volume (which is computationally very expensive and needs huge amounts of disk storage space), only the energy equation is solved, incorporating into this the heat-transfer coefficients (h) determined from full CFD steady-state runs at various power-dissipation levels (i.e. full coupling between the flow field and thermal field is replaced by weak coupling). It is claimed that this simplified heat-transfer-coefficient CFD model, or h-model significantly reduces computation time for steady-state problems from 4.5 hours to a few minutes and can be customized as per the customer required power scenarios. This work acknowledges that the temperature profiles obtained with their new method is within 5% of the temperature distribution obtained from the full fledged CFD simulation. While, this approach reduces the simulation time, it is different from what has been demonstrated in our scaled specific heat approach, with the approach described by us here being easier to implement, as well as resulting in accurate solutions at steady state; since the coupling of the thermal phenomenon with flow, electrical, mechanical, etc., phenomena is not affected, their interdependence is also captured accurately.

In his dissertation work, Mikhail Noskov (2003) has demonstrated the use of a stable fully implicit compact scheme solver for monitoring steady state heat generation in multi-component reacting mixtures. The governing equations in this work are based on the vorticity-velocity formulation. The solution method used is the damped modified Newton's method. Based on the results, it has been shown that the new implicit method leads to significant reduction in computational time compared with the first order accurate implicit solver. A sample calculation showing the heat generation in a laminar methane-air diffusion flame with detailed chemical kinetic and transport model has been presented. While this work claims that the computation time is significantly reduced for a coupled thermal phenomenon, this has been achieved by a new implicit solution approach and not by reducing the thermal inertia (specific heat capacity) as shown in our current work. Also, this dissertation work focuses only on the thermochemical coupling, whereas our current work is more generally applicable.

In the 2005 paper of Qi et. al., a novel approach to study the dynamic thermal management in an integrated circuit has been demonstrated. This study has been carried out at the electronic chip level and is based on the observation that the power consumption of architecture level modules in microprocessors shows strong periodicity. The problem has been broken down into two steps; 1) the steady state response obtained by performing a fast spectrum analysis in frequency domain and 2) The transient temperature changes due to initial conditions and constant power inputs obtained by using moment matching approach which is numerically stable. The final output is the sum of the outputs of these two steps. It has been claimed that this fast thermal analysis algorithm leads to 10× to 100× speedup over traditional integration-based transient analysis. While this work acknowledges that there is a small loss in the accuracy of the solution, it is also different compared to our approach of reducing the thermal inertia of the body. This work performs spectrum analysis in the frequency domain whereas our approach is used in the time domain itself. Also, there is no loss of accuracy using our approach of scaling the specific heat.

In the work of Celo et. al. in 2005, a model reduction technique has been used to perform the thermal analysis of electronic components and devices which have complex geometries. It has been claimed that this model with a reduced order has the capability to predict a detailed 3 dimensional steady state temperature distribution with an accuracy of 0.1% compared to a detailed numerical model. It is also mentioned that the small size and the simplicity of the reduced model helps in performing the simulation very quickly as well as under very wide ranges of input parameters like different boundary conditions and power distributions. Although, very high accuracy has been claimed in this work, reducing the size of the model may have 'size' effects on some other thermal problems. So this method can only be used to study the specified electronic components. On the other hand, the new scaled specific heat capacity method demonstrated by us doesn't have any restriction on the type of problem to which it can be applied and is more simple to implement compared to the reduced model size method mentioned in this paper.

In the 2006 paper of Yang et. al., the improvement in the thermal analysis performance and accuracy in integrated circuits has been demonstrated. It is claimed that the method in this paper accelerates the steady state solution by 21.6 to 690 times compared with the conventional analysis techniques. The new method here is composed of spatially-adaptive multigrid iterative solver, a new temporally and spatially adaptive asynchronous time marching solver, and a new spatially-adaptive frequency-domain moment matching solver. Together, these analysis techniques allow the solution system to efficiently perform the static, short time scale, and long time scale variants of the IC thermal analysis problem. Again, in this work the acceleration to the steady state solution has been achieved, but, by modifying the solver algorithm itself. This is different compared to our work, where only the thermal inertia of the body is reduced so that the steady state can be achieved faster. In our work, there is no change to the solution algorithm itself. Our approach is much easy to implement and is independent of any software or solver algorithm. The work in this paper can be benefitted immensely by our scaled specific heat capacity analysis technique.

In their patent (#WO 1995-019007 A1), Bouchez et. al. have demonstrated a method of predicting steady state condition based on the transient monotonic or the cyclic data from previous time. They have identified a first and second property state value corresponding to the transient data at specific times within the testing time period. Based on the first and second rate-of-change value a time constant value is computed next. In order to obtain the projected steady state condition value, the second rate-of-change value, the second state value and the time constant value are used with a projected steady state conditions function. This process is then repeated until the difference between two steady state condition values is then less than a threshold value. This approach is similar to fitting a curve to the available transient data and then extrapolating it ahead in the time until the slope of the curve approaches zero (i.e. steady state is attained). The drawback of this approach is that the steady state obtained is based on data extrapolation and it cannot be said with certainty if it will be the actual steady state of the system. Also, the steady state mentioned here doesn't correspond to thermal steady state but is a general term for a system under environmental and/or operating conditions.

In their patent numbered WO 2007-070879 A1, Chandra et. al. have demonstrated the use of heuristics to adaptively gird space in 3 dimensions. This approach is used to model the temperature distributions in the integrated circuit chip. This locally variable gird has been used to obtain transient and or steady state temperatures. If localized high temperature regions are observed, the thermally aware design suit will automatically make a change to the chip layout so as to make the temperature distribution uniform. The main aim of this work is significantly different compared to the present work of scaled specific heat capacity. Also, the steady state temperatures are obtained in a different manner using heuristics.

In the patent # U.S. Pat. No. 4,259,859 A by Iida et. al., a method by which the thermal properties like specific heat, thermal conductivity, and thermal diffusivity of a system involving basically and perfectly arbitrary boundary and heating conditions with ease of operation and high accuracy has been described. This work relates just to obtaining the thermal properties of the material and doesn't involve any thermal steady state analysis or coupled thermal steady state analysis. Thus, this work is different than what has been proposed in the present scaled specific heat capacity approach of obtaining the thermal steady state in a coupled thermal phenomenon.

BRIEF SUMMARY OF THE INVENTION

Obtaining steady state temperature distribution is computationally very expensive, either via a single coupled thermomechanical analysis, or via a multi-step iterative sequence of thermomechanical and steady state analyses. Transient FEA results show that the time constant of the temperature changes of the tool is very high, causing the temperature to not reach steady state for reasonable termination times in coupled thermomechanical analyses. Our invention involves reducing the thermal inertia per unit volume (specific heat capacity) of the cutting tool by scaling down the specific heat of the tool by a large factor and carrying out a short duration single step thermomechanical analysis to attain the steady state temperature distribution. It is shown that the thermal time constant for regions of scaled specific heat capacity is reduced by the same scaling factor used for the specific heat capacity, thus attaining a steady state temperature distribution very rapidly. Based on sound theoretical principles, it is shown that the steady state temperature distribution achieved by scaling the specific heat capacity is fully accurate, with no loss of accuracy whatsoever. Observed results of simulations are shown to back this claim. With this invention, the steady state temperature distribution for the example shown was achieved at approximately 1500 µs of simulation time, as opposed to approximately 25,000 µs without the use of the novel approach, with a corresponding ratio of computational effort for the analyses. Rapid attainment of steady state temperature distributions permits the tool wear rate to be calculated accurately using tool wear models. This can be used to track changes in tool geometry due to wear over time, and resulting changes in the machining process and part quality produced. The scaled specific heat capacity approach invented by us is extremely easy to use, doesn't require any manual intervention to transfer data from one step to another, and is fast as well as accurate. This approach can be used to accelerate thermal transients and arrive at accurate steady state temperatures in many other applications involving a range of phenomena coupled with temperature, where the thermal changes are the most sluggish and take the most time to reach steady state.

BRIEF DESCRIPTION OF THE DRAWINGS

These and other aspects will now be described in detail with reference to the following drawings.

DETAILED DESCRIPTION OF THE INVENTION

In the following we illustrate the invention using machining (also known as cutting) as a specific embodiment of the way in which the invention may be practiced. This embodiment is described in sufficient detail to enable those skilled in the art to practice the invention. It is to be understood that other embodiments may be utilized and that structural, logical and practical changes may be made without departing from the scope of the present invention. The scope of the present invention is defined by the appended claims and therefore the following description of example embodiments should not to be taken in a limited sense.

The present subject matter concerns the thermal modeling of a metal cutting process. Various embodiments model the thermal properties of a tool for machining. The present subject matter extends to metallic tools, as well as those that are not. Further, the present subject matter extends to workpieces that are metallic, as well as those that are not.

Figure 1:
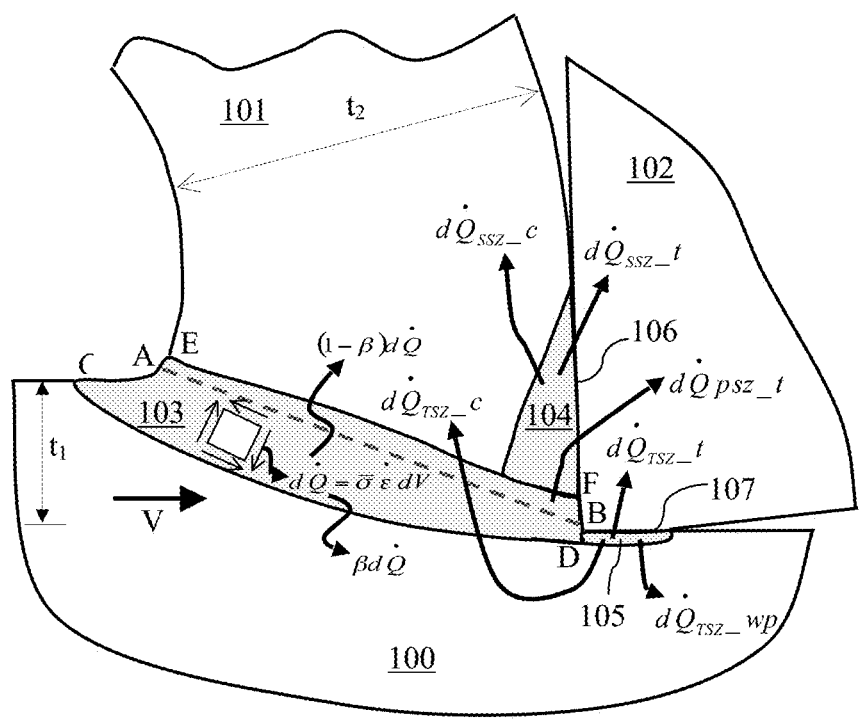
FIG. 1 shows principal areas of interest in machining (Ernest and Merchant, 1937); the primary shear zone (PSZ), the secondary shear zone (SSZ) and the Tertiary shear zone (TSZ)

The problem at hand and the approaches to solution are described next. FIG. 1 shows the geometry of a machining process of a work piece 100 by tool 102 to produce a shaving or chip 101. While most of the deformation occurs in the primary shear zone (PSZ) 103, additional deformation also occurs at the secondary shear zone (SSZ) 104 adjacent to the tool-chip interface (106) along the rake face of the tool and the tertiary shear zone (TSZ) 105 adjacent to the tool-machined surface interface 107 along the flank surface of the tool. Most of the work of deformation in the PSZ, SSZ and TSZ are dissipated as heat energy. Additional heat energy is liberated due to frictional sliding of the chip over the tool rake face along the chip-tool interface 106 and due to frictional sliding of the machined surface over the tool flank surface along the tool-machined surface interface.

These heat energy liberated at these heat sources is conducted by the materials, as well as convected by the flow of material in the workpiece and chip regions, causing the temperature of the workpiece, chip, tool and machined surface to increase. At the same time, the magnitude of the heat sources is also dependent on the temperature. This nonlinear coupling between the temperature and deformation fields requires that the transient changes be followed over time by using a calculation procedure such as a transient finite element analysis in order to arrive at the correct temperature distribution at steady state.

Figure 2:
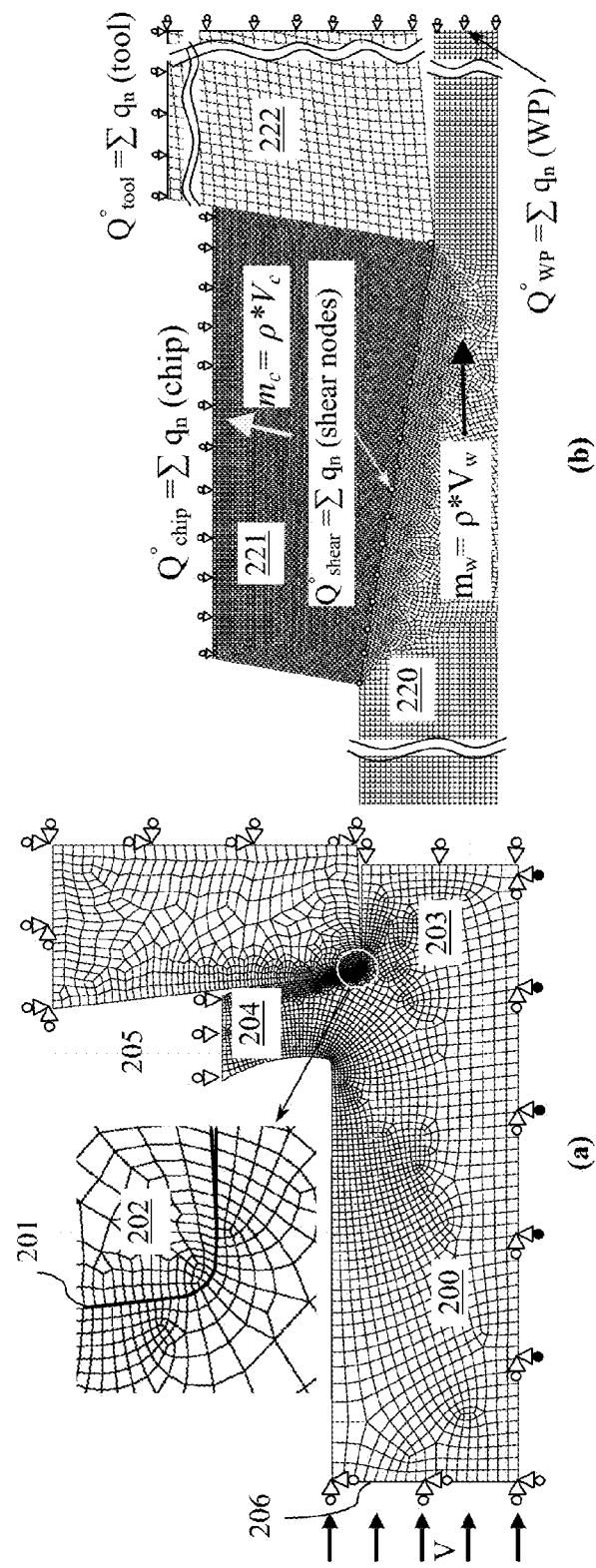
FIG. 2 (a) shows the boundary conditions and the final chip geometry obtained at the end of the thermomechanical simulation and initial mesh and boundary conditions, and FIG. 2 (b) shows the geometry for steady state analysis and the thermal boundary conditions associated with it.

FIG. 2(a) shows a finite element model of the machining of a workpiece 200 by a tool 202 to produce the chip 204 and the machined material 203. While many types of finite element analyses can be carried out, the particular type shown here is an Arbitrary Lagrangian Eulerian (ALE) model, wherein the work material flows through the mesh and the material in the tool is stationary. In the ALE Formulation the nodes are continuously moved to remove mesh distortions. This makes it possible to maintain a high-quality mesh throughout the analysis, even in the presence of severe localized strains.

Figure 8:
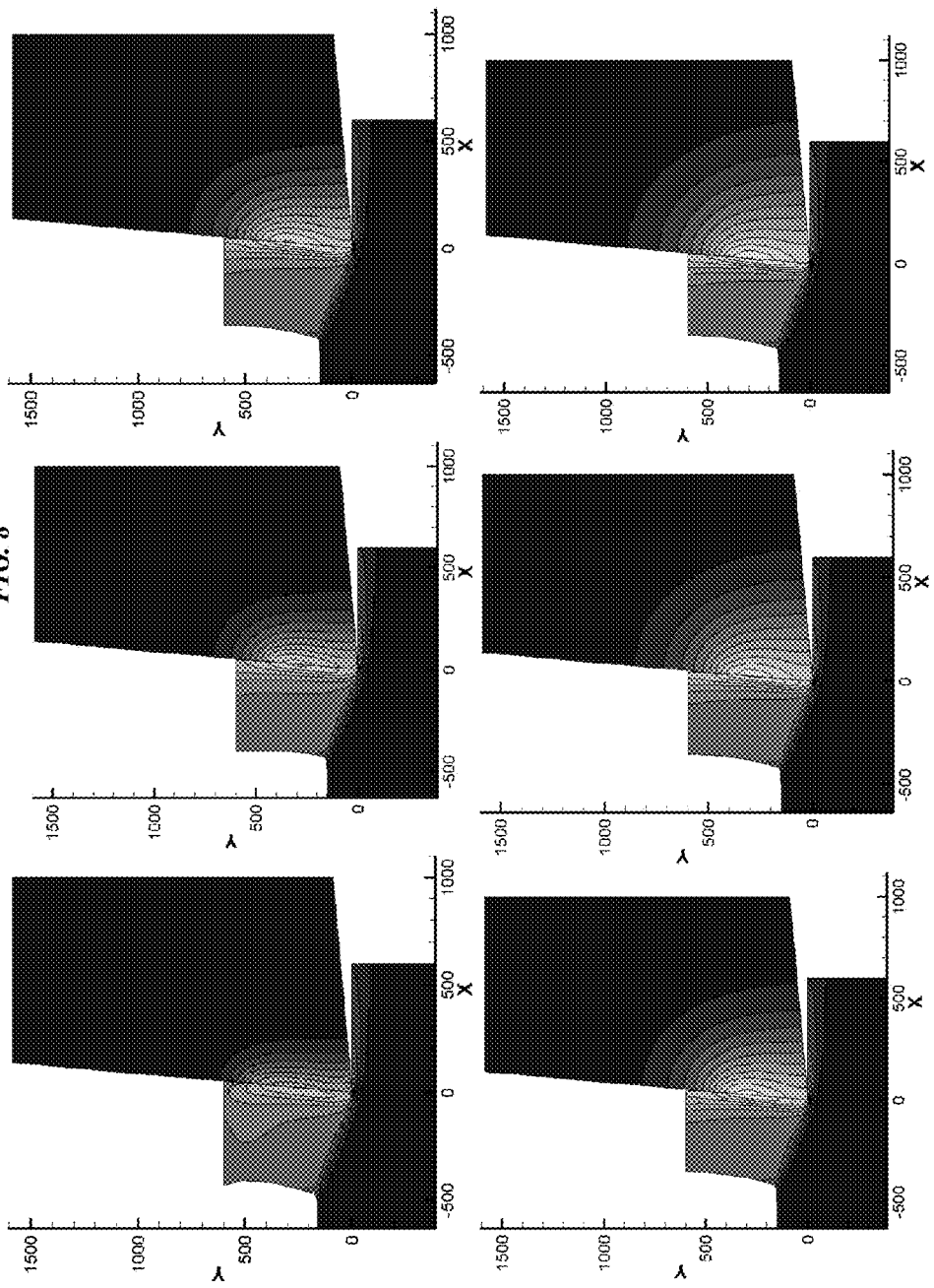
FIG. 8 shows the variation of temperature distribution as the first step thermomechanical simulation progresses in time. The hottest point on the tool rake face is also marked and the temperature variation of this point has been plotted in the left side of FIG. 10.

Fully coupled thermo-mechanical calculations are used to track the evolution of the velocity (deformation) and thermal fields. Contact between the tool and the work is enforced along the tool-chip contact interface 201. Appropriate boundary conditions are used, for instance, at the inlet 206 and the outflow 205, to enforce the restrictions on the behavior of the material and the movement of the mesh. The free surfaces are Lagrangian and move to track the free surface of the work and chip as they evolve over time. The analysis begins with an arbitrarily chosen mesh geometry. The chip geometry gets modified automatically as the analysis progresses and converges to steady state flow of the material throughout the domain as shown in FIG. 8. The time interval between each of the images shown in FIG. 8 is about 600 µs. It can be seen that, after a time of around 2400 µs, further changes in the velocity field with time become insignificant, indicating the development of a steady flow pattern.

Figure 10:
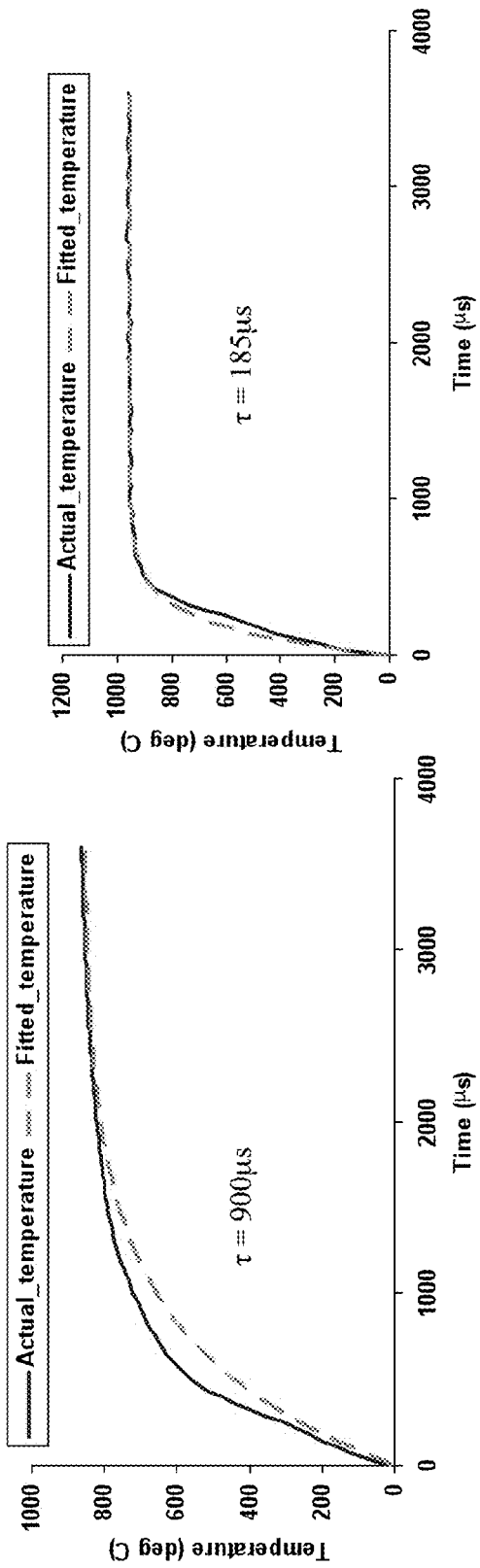
FIG. 10 compares the thermal time constant obtained from the first step thermomechanical simulation with the thermal time constant obtained from the single step scaled specific heat thermomechanical simulation.

It can also be noted from FIG. 8 that the temperature field within the tool is not at steady state, with only the regions close to the tool-chip interface getting heated up. FIG. 10(a) shows the time history of temperature at a point on the rake face of the tool (at which the maximum temperature is recorded at the end of the thermomechanical analysis). It can be seen that the time constant of even this point is of the order of 900 µs. Points away from the interface have much larger time constants.

This observed time history of temperature is approximated using the equation $T=T_0(1-e^{(-t/v)})$, where t is the time, T is the temperature, $T_0$ is the final temperature and v is the time constant. A curve fitting procedure is used to obtain the time constant.

Figure 9:
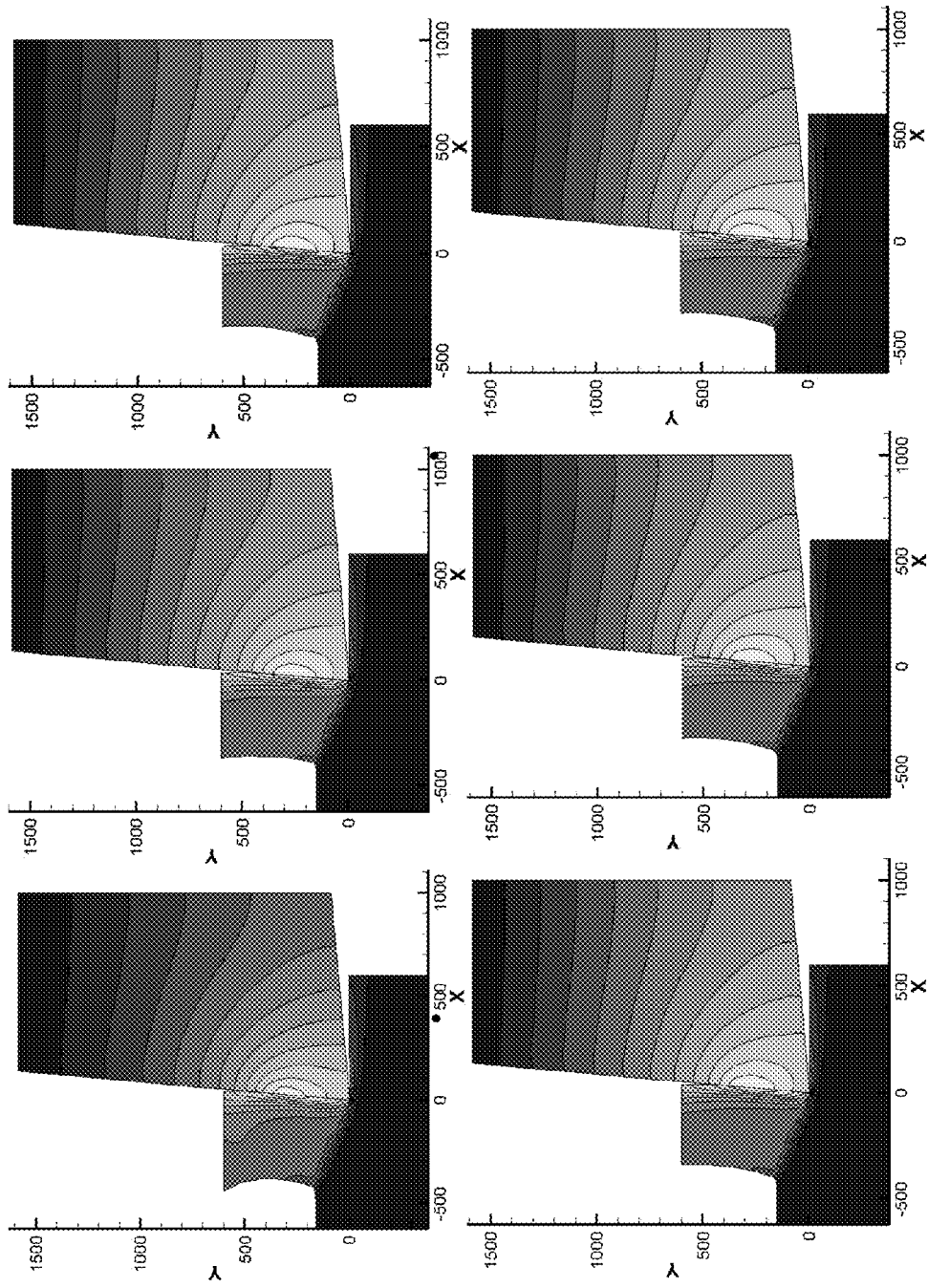
FIG. 9 shows the variation of temperature distribution as the single step thermomechanical simulation with scaled specific heat progresses in time. The hottest point on the tool rake face is also marked and the temperature variation of this point has been plotted in the right side of FIG. 10.

While steady state under most commercial conditions is typically achieved within 0.01 s to 1 second of cutting (as evidenced by FIG. 9 (b) wherein steady state is achieved within 1200 µs, which due to the $\frac{1}{50}^{th}$ scaling is equivalent to about 0.06 s of real time), even this small time is difficult to simulate accurately, needing very large amounts computational time (presently days, weeks or months depending on the size and complexity of the model).

Figure 3:
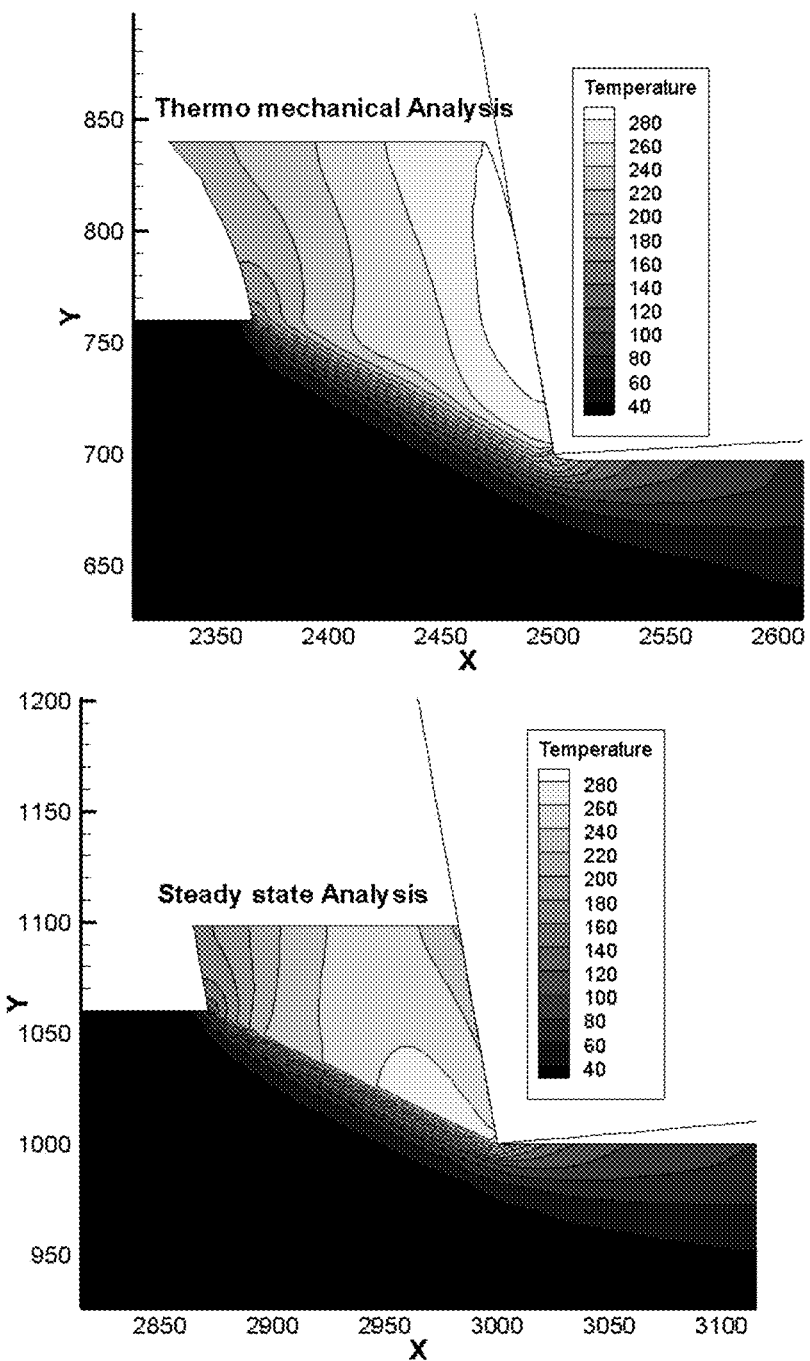
FIG. 3 shows the temperature distribution in the workpiece and tool obtained from (a) thermomechanical analysis for 60 µm feed, 4 m/s cutting speed, negative 10 degree rake angle with zero coefficient of friction and with perfectly plastic material model and (b) the corresponding steady state heat transfer analysis with only the primary shear zone heat applied.

Therefore, simpler models such as the steady state heat transfer model shown in FIG. 2(b) are used. The model assumes a fixed geometry of the tool 222 and the shape of the free surfaces of the workpiece 220 and chip 221 may either be imported from the results of a transient thermomechanical analysis such as described above or assuming a simplified geometry as shown in FIG. 2(b). The heat sources are assumed to be constant, either at the values found for each node from the transient thermo-mechanical analysis or approximated by lumping them together as in FIG. 2(b). Since only steady heat sources and material flow velocities are modeled, this uncoupled thermal model can be solved within minutes and produces a steady state distribution. However, note that if the change in temperature from the end of the thermomechanical simulation to that found to be the steady state is significantly large, as shown by way of example in FIG. 3 and by comparison of FIGS. 11(a) and 11(b) (which show the temperature fields at the end of the first transient thermomechanical analysis and at the end of the steady state analysis with the geometry, heat sources and velocity field from the thermomechanical analysis as inputs), then the heat sources would be different from that assumed and this will have to be tracked by iteration through the thermomechanical simulations and the steady state simulations till convergence (i.e. negligible change in the temperature field during the steady state step) is achieved.

Multi Step Analysis of Machining

Figure 4:
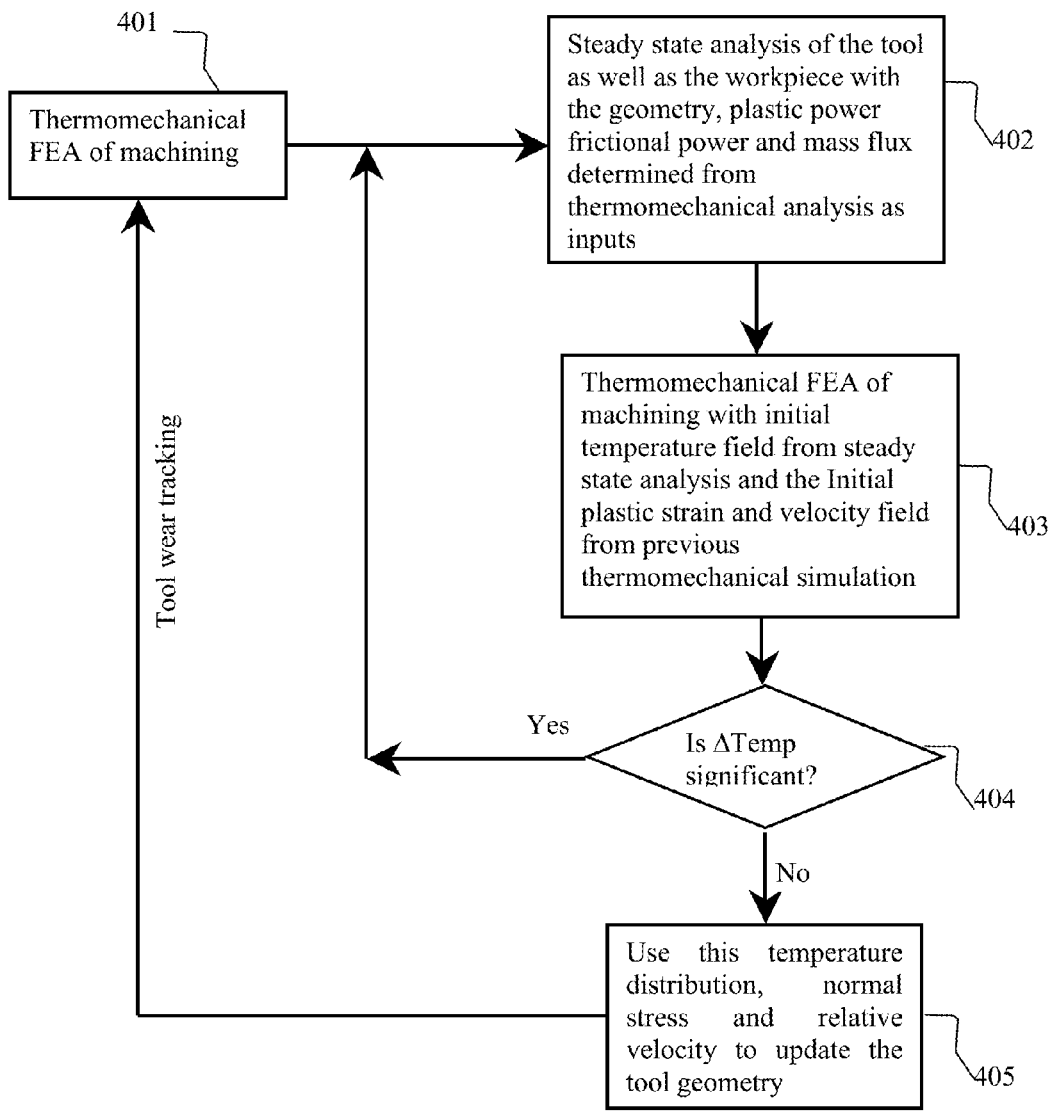
FIG. 4 is a block diagram with the different steps involved in a multi-step analysis carried out to obtain steady state temperature distribution.

In our attempts to model the tool wear progression accurately, our initial approach followed the prior art by Yen et al. (2004), with some improvements as shown in FIG. 4. Yen et al. (2004) carried out a first thermomechanical analysis 401 for an initial time period, used the heat sources and boundary conditions to obtain the steady state temperature distribution (of only the tool) 402, assumed that this would be the final converged temperature distribution and calculated the worn profile of the tool 405 and iterated over these two steps to follow tool wear progression.

In addition to the tool, we included the workpiece also in the steady state analysis. The steady state analysis was carried out with the steady geometry and velocity fields obtained at the end of the thermomechanical analysis. The plastic power dissipation at the elements is calculated and 95% (Taylor-Quinney coefficient) of it is applied as heat flux at the nodes. At the contact surface, the frictional power at the nodes is also added to the heat sources.

Figure 11:
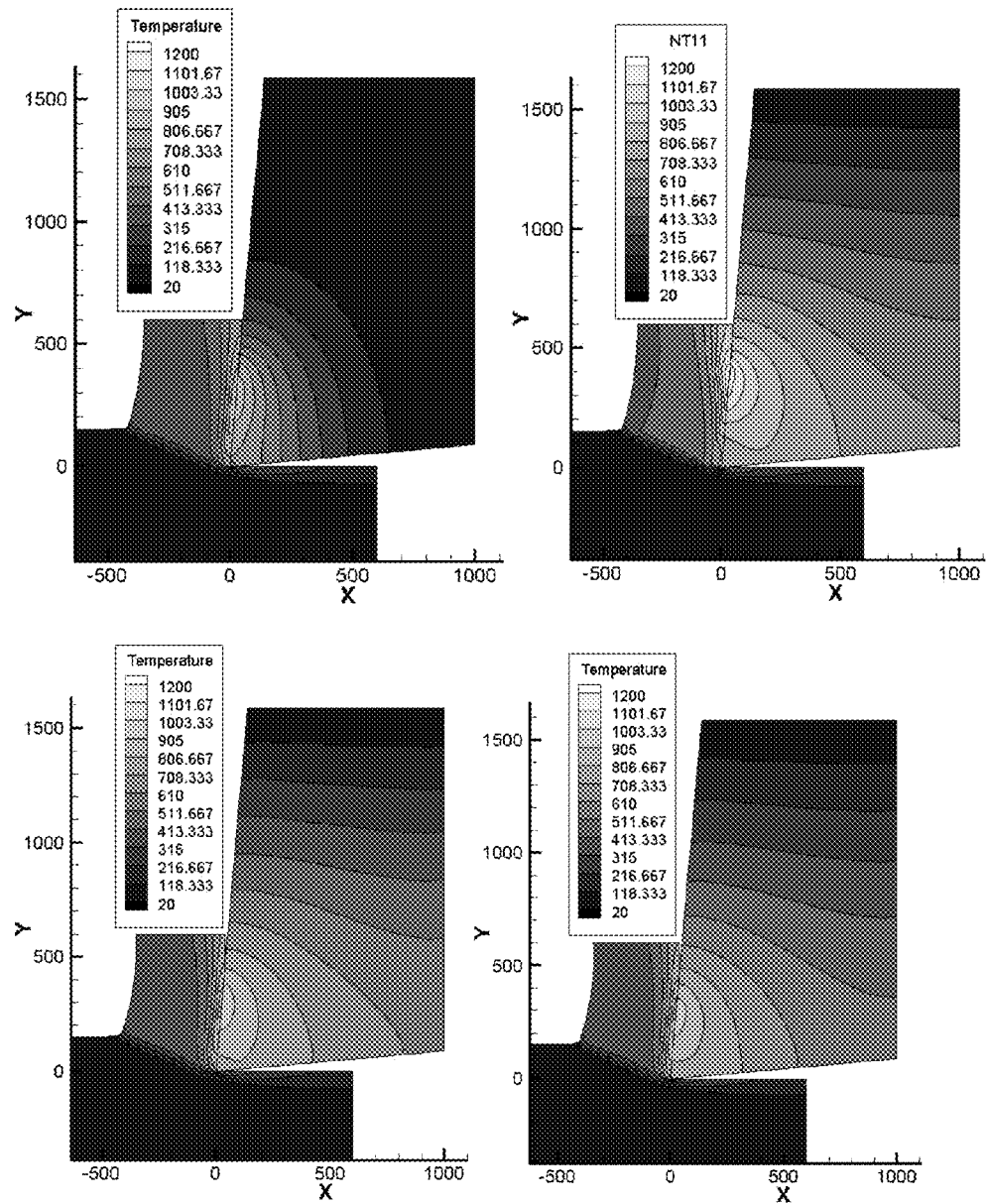
FIG. 11 compares the temperature distribution obtained from (a) first step thermomechanical simulation, (b) second step heat transfer steady state simulation, third step thermomechanical simulation, (d) with the single step scaled specific heat approach simulation.

In addition, we carried out a third thermo-mechanical analysis 403, with the plastic strain distribution and velocity fields from the first thermomechanical analysis and the temperature field from the second steady state analysis as inputs, to check whether convergence was indeed achieved, and if the differences in the temperature fields at the end of the third thermo-mechanical analysis (FIG. 11(c)) and the second steady state analyses (FIG. 11(b)) were significant 404, iteratively carried out steady state and thermomechanical analyses till convergence was achieved. The two thermomechanical analyses have a timeframe of about 3000 microseconds each to allow the temperatures to stabilize.

As can be seen from FIGS. 11(b) and 11(c), the changes are indeed significant. The temperatures drop initially in the third step and then stabilize at values less than those given by the steady state analysis. This drop in temperatures is attributed to the fact that the heat flux due to frictional dissipation, which is a function of the temperature and decreases as the temperature increases; is treated as a constant value in the steady state analysis, leading to over-prediction of the tool temperatures. This over predicted temperatures made the material too soft at the beginning of the third thermomechanical step, also reducing the power due to plastic dissipation in the third step. This reduction of both frictional and plastic power is what lead to reduction in the tool temperature in the third step thermomechanical analysis, which helps move the results closer to convergence.

Thus it can be seen that the multi step analysis is not a very efficient way to evaluate steady tool temperatures. The multi-step approach also demands tremendous manual work to set up the input files each time (especially to average the geometry, heat sources, and velocity fields over time to mitigate the effect of noise in these fields, and to calculate the heat sources at the nodes due to plastic power within elements; these are tedious and error-prone) as well as much computational effort.

In order to overcome the drawbacks of the state of the art, the present subject matter includes a new method to accelerate the attainment of steady state temperatures within the tool during a coupled thermomechanical finite element analysis of the machining.

Single Step Thermomechanical Analysis with Reduced Specific Heat of the Tool

Transient thermal problems involving conduction of heat within an isotropic material of thermal conductivity K, specific heat C and density ρ are characterized by the differential equation $$\left(\rho C \frac{\partial T}{\partial t}\right) - \left(\frac{\partial}{\partial x}\left(K \frac{\partial T}{\partial x}\right) + \frac{\partial}{\partial y}\left(K \frac{\partial T}{\partial y}\right) + \frac{\partial}{\partial z}\left(K \frac{\partial T}{\partial z}\right)\right) =$$

$$\rho C \frac{\partial T}{\partial t} - \vec{\nabla} \cdot (K \vec{\nabla} T) = 0$$

which states that the divergence of the heat flux, i.e. the net heat flux per unit volume due to conduction, is equal to the rate of increase in heat energy of that unit volume. This equation is applicable for a stationary medium.

The achievement of steady state by a point of a material is defined strictly as the attainment of a temperature that is constant over time, (i.e. the rate of change of temperature over time, of the same point of material is zero). By this definition, a region of material has achieved steady state if the temperature of each of the material points belonging to the region is constant over time. For the purposes of numerical solutions of the evolution of the temperature distribution over time, steady state can be defined as the condition wherein changes in temperature of a material point over time are small so that the change in heat energy of the material per unit volume due to these temperature changes ($\rho C \Delta T$) is negligible compared to the change that has occurred to that point ($\rho C(T-T_0)$). The point can be said to be "near steady state" if change in heat energy of the material per unit volume due to the temperature change over a pre-determined time interval ($\rho C \Delta T$) is a small fraction of the overall change ($\rho C(T-T_0)$). The temperature at a point can be said to be oscillatory if the changes over time are significant compared to the overall change during the transient. Whether a point is at steady state, approaching steady state, or is experiencing fluctuations in temperature can be determined by analyzing the time history of temperature at that point to determine the above mentioned changes. When random fluctuations are present, the signal (time history of temperature) can be converted into the frequency domain and the ratio of energy in the higher frequency terms to that in the lower frequency terms of the power spectrum can be used to identify regions where significant thermal fluctuations are present.

At steady state, since the rate of change of temperature with time is equal to zero, the equation simplifies to $\vec{\nabla} \cdot (K \vec{\nabla} T) = 0$ and becomes independent of the specific heat capacity ρC. This leads to a key realization, that the solution for the steady state temperature distribution within a stationary medium is independent of its thermal capacity, and would be the same even if the specific heat capacity were changed randomly from point to point within the medium.

Since the transient state involves a change of temperature by a certain magnitude, and since the divergence of heat flux by conduction is independent of the specific heat capacity ρC, reducing ρC (also aptly called the thermal inertia per unit volume of the material), will reduce the time within which the transient change in temperature is accomplished. As will be seen below, there is a lower limit to the scale factor by which the thermal inertia per unit volume can be reduced, arising from the fact that reducing it requires the calculations used to track the transient changes in temperature to be carried out with extremely small time steps.

It should be kept in mind that, if the specific heat capacity ρC were scaled differently in different regions of a material, the temperature distribution within the material prior to the time at which steady state is achieved will depend on the distribution of ρC used and will be different from that with the original ρC. However, as seen above, the temperature distribution at steady state will be unaffected.

Note that, the independence of the steady state temperature distribution with respect to arbitrary changes in ρC does not carry over to the thermal conductivity K. If K were varied from point to point, the steady state solution for the temperature distribution will vary. K can be scaled uniformly over a domain, without affecting the steady state temperature. However, even this may not be possible to do, for instance, if the boundary conditions of the domain are such that changes to the thermal conductivity of the domain would affect the heat flux into the domain.

Figure 5:
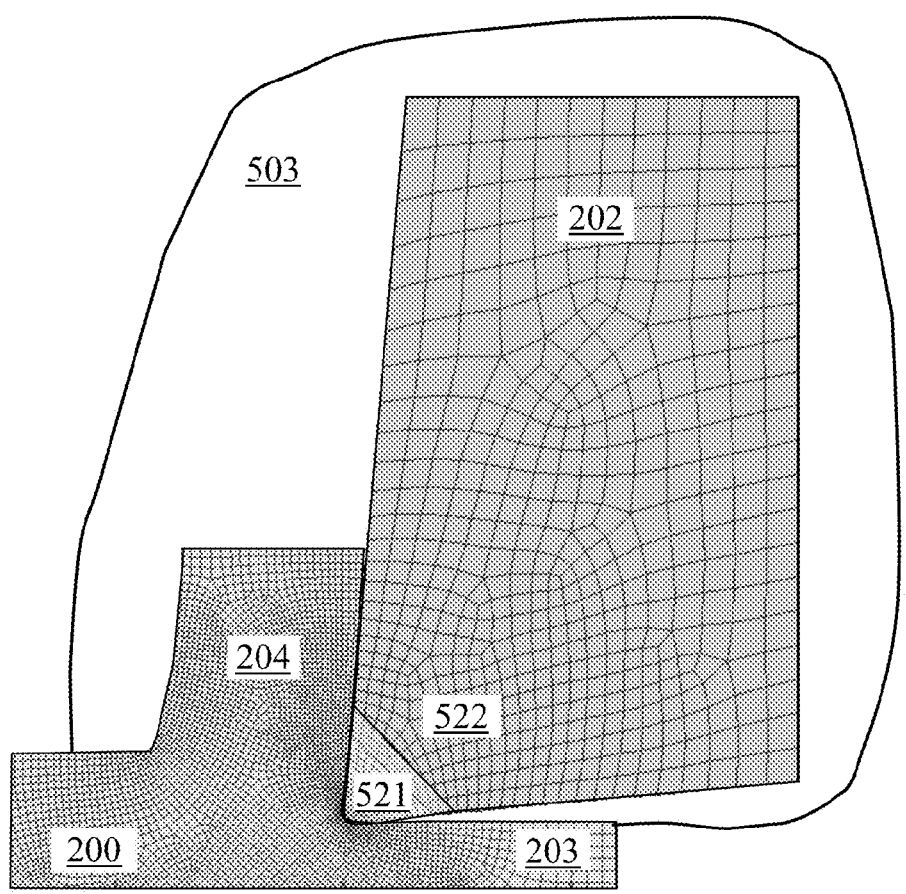
FIG. 5 shows the workpiece domain, the cutting tool domain split in 2 parts; the tip part with small size elements having original C value and the free end with large elements having C value reduced by a factor of 50; part of the tool and the workpiece are surrounded by the coolant 503, in accordance with an embodiment of the present invention.

In order to verify that the steady state temperature distribution is not affected by scaling the specific heat capacity, two steady state analyses of machining were carried out; one by assigning the original ρC to the tool and the other by assigning ($\frac{1}{50}^{th}$) of the original ρC to the tool. As expected, it was observed that both these analyses gave exactly the same steady state temperatures. Thus it was decided to use a smaller value of C ($\frac{1}{50}$ of the original value) for the tool and carry out a thermomechanical analysis. As seen earlier the reduced C should not affect the steady state temperature distribution. However, a uniform reduction of C over the entire tool was found to cause the thermal time step size to become smaller than the mechanical time step size (as discussed below). To avoid this, the value of C was kept unchanged in the tool tip region containing the smallest elements, 521 in FIG. 5, while the C of the elements in the rest of the tool, 522 in FIG. 5, was reduced to $\frac{1}{50}^{th}$. As discussed above, non-uniform reduction of C does not affect the steady state temperature distributions.

Reducing C implied reducing the thermal inertia per unit volume of the cutting tool and thus accelerating the temperature rise in the tool so that the steady tool temperatures would be obtained faster, in a one step thermomechanical analysis itself. This can be seen in FIG. 9, wherein the temperature distribution shown in FIG. 9(b), at the time of 1224 μs, is nearly at steady state, slightly changing further only on account of changes in the deformation field. FIG. 10(b) shows that even the maximum temperature along the rake face evolves much more rapidly than in the thermomechanical analysis without scaling the specific heat capacity.

Tool Wear Modeling

Since the economics of the machining process is largely influenced by tool wear, a key reason for evaluating the steady tool temperatures is to track the wear of the tool. Researchers have proposed various tool wear models based on the tool temperatures, stress and relative velocity. Usui et al. in 1978, proposed the following empirical expression for crater wear of a carbide tool while machining carbon steels.

$$\frac{dw}{dt}(MPa^{-1}) = \sigma_t V_c * 0.01198 e^{(-21950/T)} \text{ for } T \geq 1150K \quad \text{(E105)}$$

$$\frac{dw}{dt}(MPa^{-1}) = \sigma_t V_c * 7.8e - 9 e^{(-5301.6/T)} \text{ for } T < 1150K \quad \text{(E.106)}$$

where, $$\frac{dw}{dt}$$

is the wear rate (m/s) normal to the tool surface, $\sigma_t$ is the normal stress (MPa) on the tool chip interface, $V_c$ is the chip velocity (m/s), and T is the rake face temperature in Kelvin.

While the above model is an abrasive wear model applicable only for the tool surface nodes in contact with the work material, other models for different modes of wear, such as diffusion wear or oxidation wear, may lead to wear and resulting changes in position of the nodes of the tool that are in the interior as well as changes in position of surface nodes close to the region of contact with the work material.

Note that, since steady state conditions within the tool are achieved within about 1 s, whereas significant amounts of tool wear typically occur over many minutes, the accelerated steady state conditions achieved at the end of each fully coupled thermomechanical analysis can be used as inputs into the wear rate model.

A limit can be imposed on the maximum incremental wear that is admissible before a new steady state analysis needs to be run to obtain temperature and mechanical fields accurately. This limit can be used to calculate a time increment to be used for calculating the worn tool profile.

The worn tool profile can then be used in a subsequent thermomechanical analysis to obtain the thermal and mechanical fields to be used in the wear rate model for determining the next increment of tool wear. Iterating over this sequence of steps, the evolution of tool wear over time and resulting changes in cutting forces, part quality, etc., can be tracked.

Figure 12:
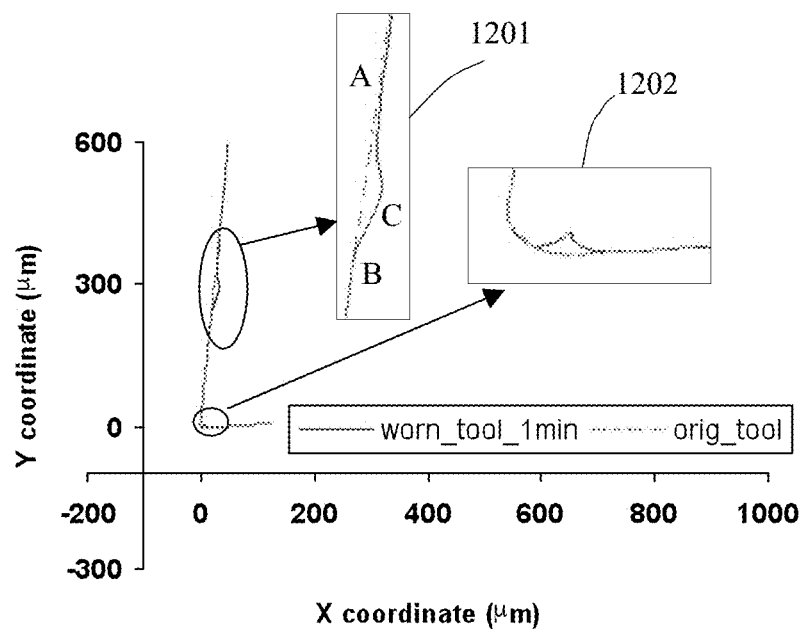
FIG. 12 demonstrates the use of steady state temperature distribution in estimating cutting tool wear using Usui's wear model.

Equations E105 and E106 representing Usui's wear model were applied to the results of the example analysis to obtain the wear of the tool over a finite time of 1 minute. The wear and the resulting updated tool profile are shown in FIG. 12. As can be noted, while the crater wear, shown magnified in inset 1201, is believable, the excessive flank wear shown magnified in inset 1202 indicates that to accurately track the rapid initial flank wear that occurs, the wear calculation should consider smaller time increments. Many iterative accelerated steady state analyses are easily doable with the aid of the present invention, but become prohibitively expensive without it.

The thermal calculations used to track the time evolution of temperature distributions typically use an explicit dynamic solution procedure, especially when other physical phenomena coupled with temperature are also being studied. In explicit dynamic solution procedures for solving the differential equation of heat flow, the time step size is restricted to be a maximum value for the solution procedure to be stable (i.e., yield accurate results). The maximum thermal time step size is given by $$\Delta t_T = \frac{\rho C}{2K} \Delta l^2 \quad \text{(E101)}$$

where $\Delta l$ is the characteristic length of the smallest amount of material over which the thermal calculations are carried out, viz., the smallest element in finite element methods, the smallest cell in finite volume methods and the smallest grid spacing in finite difference methods.

Introducing a reduction scale factor $\alpha$ for the thermal inertia per unit volume, the equation becomes $$\Delta t_T = \alpha \frac{\rho C}{2K} \Delta l^2 \quad \text{(E102)}$$

indicating that the maximum permissible thermal time step size for a given element size decreases by the same proportion that the specific heat capacity is reduced. This leads to a lower limit on useful scale factors $\alpha$, below which the thermal time step size will become smaller than the maximum time step size that can be taken while still accurately tracking other coupled physical phenomena ($\Delta t_P^{min} = \min(\Delta t_P^i)$ where $\Delta t_P^i$ is the maximum permissible time step size for accurately tracking phenomenon i).

The scale factor $\alpha$ can be calculated as $$\alpha = \Delta t_T \frac{2K}{\rho C \Delta l^2} \quad \text{(E103)}$$

where $\Delta t_T$ is the desired thermal time step size and $\Delta l$ is the size of the smallest amount of material over which the thermal calculations are carried out. In most cases $\Delta t_T$ may be equal to $\Delta t_P^{min}$. For typical element sizes used in accurate finite element simulations of machining, the factor $\alpha$ is of the order of 0.02 to 0.1 for the smallest elements. Note that the scale factors can be changed on an element-by-element basis so that the minimum of the maximum permissible thermal time steps is greater than for other phenomena ($\Delta t_P^{min}$).

It should be noted that the scale factors mentioned above are over and above any other unit conversion factors or mass scaling factors used to represent the material properties for accurate calculation of the phenomena of interest. For instance, the density of the tool $\rho$ may have been increased by a factor of 100 to make sure that the tool elements do not set the lower limit for the maximum permissible mechanical time step size. To compensate for this the specific heat C may have been reduced by a factor of 100 to keep the specific heat capacity ($\rho C$) unchanged. These values are called original values, that ensure an accurate calculation and are the values used in the equations given.

Another key realization is that equation E101 can be interpreted more generally as relating the time period required for a thermal signal to propagate a length $\Delta l$. If $\Delta l$ is the size of a region over which the propagation of a disturbance needs to be studied, E101 can then be applied to estimate the time period required to be studied.

Equation E102 indicates that the time period over which the effect of a disturbance (occurring over a characteristic length $\Delta l$) is felt decreases by the same factor as the decrease in thermal inertia per unit volume.

Equation E101 can be rearranged to estimate the characteristic length over which a disturbance will be felt, if the disturbance has a time period of $\Delta t$.

$$\Delta l = \sqrt{\Delta t \frac{2K}{\rho C}} \qquad (E104)$$

Note that if the thermal inertia per unit volume is reduced, the distance over which a disturbance lasting for the same time period is felt increases. If the specific heat capacity were decreased 100-fold, the disturbance length would increase 10-fold. Scaling the specific heat capacity in a region next to one experiencing fluctuations in its temperature will therefore affect the accuracy of the results in and around the region experiencing the fluctuations.

It has been experimentally observed that the effect of the steady state tool temperature on the process of shear banded chip formation can be significant. The degree of shear banding encountered while cutting AISI 4340 at HRc 45 under some cutting conditions has been observed to increase with cutting time, as the tool heats up and approaches towards steady state. The time required is of the order of 100 ms to 1 s. It is computationally very expensive to carry out accurate finite element simulations of the machining process for such long times. Keeping the elements near the chip-tool interface at their correct specific heat capacity, but reducing the specific heat capacity of the elements of the body of the tool apart from the interface (and if infinite elements are used, reducing their specific heat capacity as well) will permit a faster approach to steady state in finite element simulations. With this configuration, note that at steady state, the temperature of a small region of the tool next to the interface will be oscillatory, but the temperature of regions farther away will be close to steady state.

Figure 6:
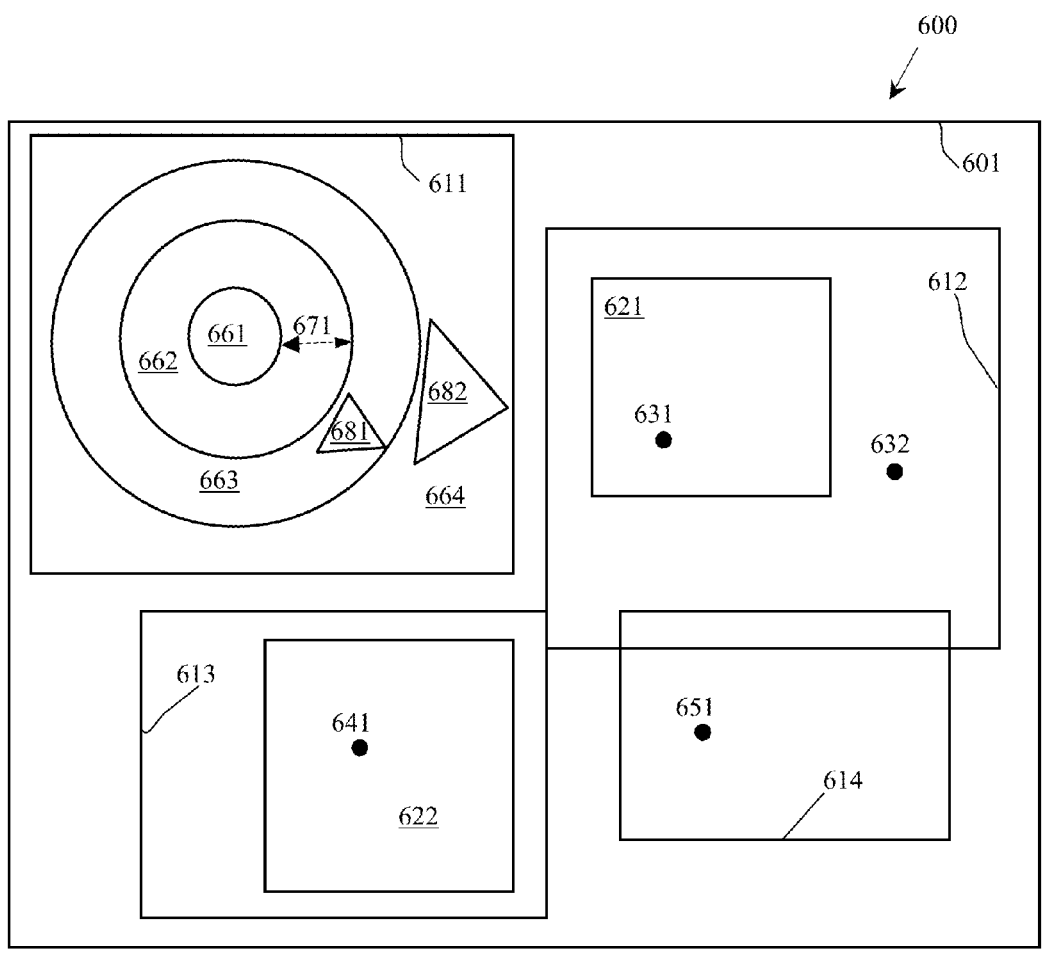
FIG. 6 shows a system with some regions where the temperature distribution can be obtained by scaling the value of C, in accordance with an embodiment of the present invention.

FIG. 6 shows a system 601 comprised of several materials 611, 612, 613 and 614. In at least one of these materials, at least one candidate region within which steady state may be attained is identified. Candidate regions identified within system 601 include 621, 622, the entire material region 614, and the remainder of material 612 with the region 621 removed.

Figure 7:
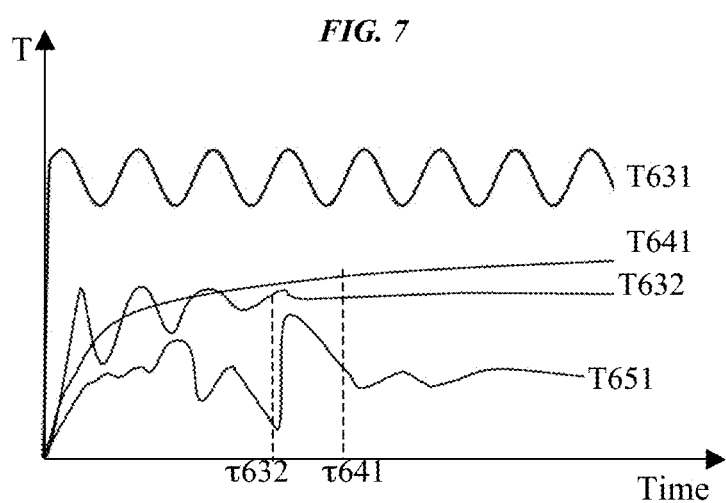
FIG. 7 shows the variation of temperature with respect to time at some points indicated in FIG. 6.

The time history of temperatures at points 631, 632, 641 and 651 within these candidate regions (obtained from an initial calculation) are shown in FIG. 7. It can be seen that the temperatures at points 631 and 651 do not tend towards steady state, whereas those at points 632 and 641 do. This indicates that regions 621 and the material 614 are not regions where the temperatures tend towards steady state. The region 622 as well as the remainder of material 612 with region 621 removed can be identified to be regions of steady state temperature distribution in which the specific heat capacity may be reduced to accelerate the attainment of steady state.

If a region, for instance 661 in FIG. 6, experiences cyclic changes in temperature of time period $\Delta t$, for instance, due to adiabatic shear banding, E104 can be used to estimate the size of the peripheral zone, 662, around it within which the points will experience a non-trivial fraction of the fluctuations in temperature imposed by the shear banding. This can be used to select regions, 663 and 664, spaced apart from zones exhibiting temperature fluctuations as candidate regions within which steady state will be achieved. Note that, depending on the characteristic size of the minimum amount of material over which the thermal calculations are performed, 681 and 682, in regions 663 and 664, respectively, the scale factor to be used in the two regions can be calculated using equation E103.

The characteristic size, 671, of the peripheral zone 662, intervening between the zones of thermal fluctuations and the regions tending towards steady state temperature distributions, estimated using E104, can be multiplied by a factor greater than one to make the choice of the region of steady state temperatures more conservative, i.e., to minimize the effect of the reduction in specific heat capacities of the steady state regions on the thermal fluctuations in the zone experiencing the fluctuation and the intervening peripheral zone.

Alternatively, the software used for the thermal calculations can automatically analyze the computed temperatures to detect oscillations in temperature and, if the oscillations are significant (for instance, determined as described above using a ratio of amplitude of the oscillation to the mean temperature), not scaling the $\rho C$ for elements nearby with nodes that exhibit at least 10% of this oscillation amplitude (or 1%, or whatever value is chosen depending on the level of accuracy desired) and scaling the $\rho C$ of the other elements.

Note that calculations of the steady state temperature distribution of cutting tools of different kinds (inserts, endmills, drills, lathe tools, coated and uncoated, subject to cooling by a flood coolant, etc.) used for different types of cutting processes, can be enhanced by appropriate application of the improvements detailed here by one skilled in the art. For instance, during the simulation of a milling process, each tool is engaged in machining for a small time and then is not machining for at least an equivalent amount of time. For this process, the time period of fluctuations of tool temperature will be the time period between cuts with the same cutting edge. To accurately model the temperature of the tool in the region of the tool-chip interface, the specific heat capacity of the tool material next to the interface should not be reduced, the characteristic size of this peripheral material being given by E104. A same objective can also be attained in a substantially equivalent manner by the alternative automated procedure based on analysis of the time history of temperature described above.

The above discussion of steady state should be distinguished from the quasi-steady state conditions that occur in control volumes through which material flows, for instance, in the machining of a material, wherein the temperature at each spatial point remains nearly constant over time. However, if the temperature varies from one spatial point to the next, the temperatures of material points flowing through the control volume change over time. According to the definition above, the material within a control volume with non-zero thermal gradients is not at steady state.

For a medium moving with velocity $\vec{V}$ through a control volume, the equation of heat flow gets modified by the addition of a term depending on the divergence of $T\vec{V}$, the product of the velocity and the temperature at each point. For an incompressible material this can be written as $$\left(\rho C \frac{\partial T}{\partial t}\right) - \left(\frac{\partial}{\partial x}\left(K\frac{\partial T}{\partial x}\right) + \frac{\partial}{\partial y}\left(K\frac{\partial T}{\partial y}\right) + \frac{\partial}{\partial z}\left(K\frac{\partial T}{\partial z}\right)\right) +$$
$$\rho C\left(V_x\frac{\partial T}{\partial x} + V_y\frac{\partial T}{\partial y} + V_z\frac{\partial T}{\partial z}\right) = 0$$

where $V_x$, $V_y$ and $V_z$ are the components of the velocity vector. Note that, at quasi steady state (i.e.

$$\frac{\partial T}{\partial t}$$

at a spatial point is zero), $-\vec{\nabla}\cdot(K\vec{\nabla}T)+\rho C\vec{\nabla}T\cdot\vec{\nabla}T=0$. This implies that, in general, the temperature distribution at quasi steady state is dependent on the specific heat capacity of the material, limiting the applicability of the above approach of reducing ρC to accelerate the achievement of steady state. For instance, this approach cannot be used to accelerate the achievement of steady state within the workpiece, which is modeled as a control volume in our ALE analysis.

Application of improvements made here by reducing the thermal inertia to domains that are purely oscillatory (which occur either with oscillatory boundary conditions, or due to non-linearities in thermal and other coupled phenomena that introduce oscillations) involves non-trivial considerations.

While much of the discussion has centered on the application of the improvements detailed here to the calculations of tool temperatures in machining, it should be obvious to one skilled in the art that the improvements are of value in a variety of other applications where temperature distributions are evaluated, and especially those applications in which the temperature fields evolve much more slowly over time than the other phenomena coupled with temperature. These include, calculations of the temperature distributions in electronic chips including IC and VLSI chips, temperature distributions in electric motors, temperature distribution over the leading edges of wings of supersonic aircraft and space vehicles, temperature distributions in gas turbines, die temperature distribution, phase changes, and die wear in wire drawing, keyhole surface temperature in laser welding, etc.

System Level Overview

Figure 13:
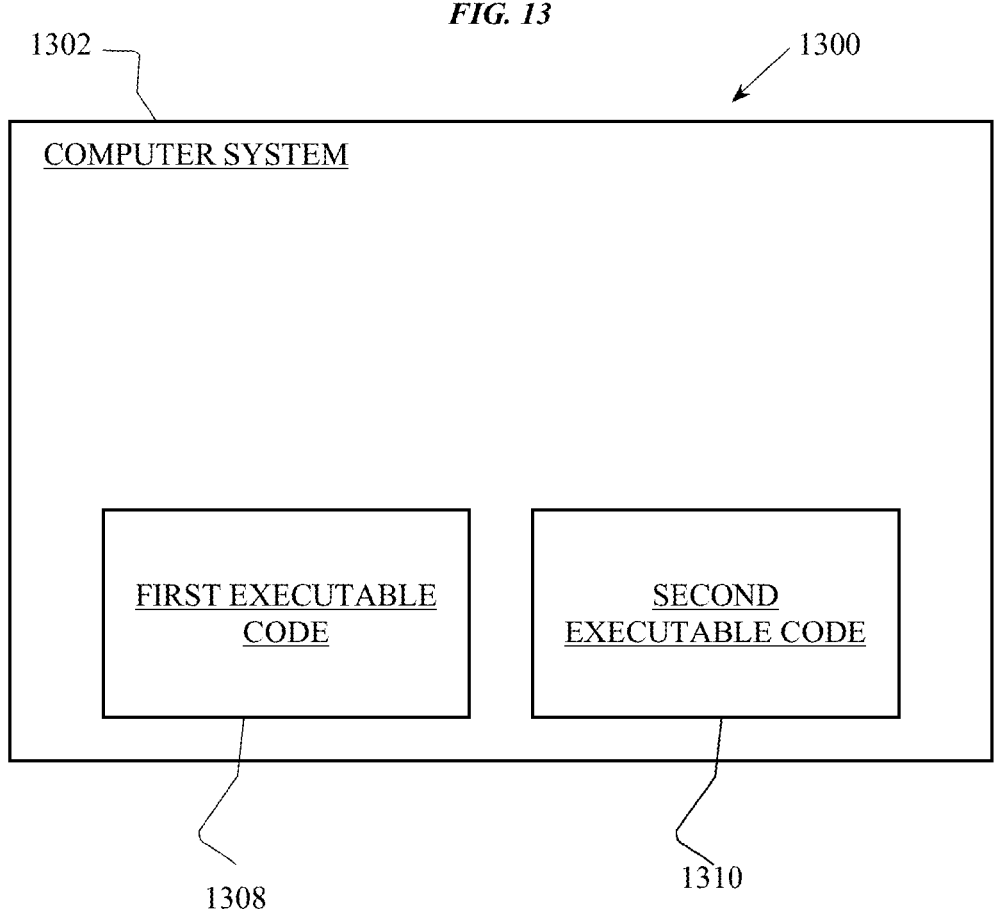
FIG. 13 illustrates a block diagram of a computer system in accordance with an embodiment of the present invention.

FIG. 13 comprises a block diagram 1300 of computer system 1302 for graphics. In various embodiments, the computer system 1302 includes a graphics processor 1304 to store values associated with a thermal simulation or thermal model. Certain computer system 1302 examples include a first executable code 1308 to evaluate a steady state temperature of a tool based on the tool structure data and one or more parameters. The evaluation is optionally based on a modified specific heat capacity of the tool that is lower than an actual specific heat capacity of the tool, as disclosed above in relation to section 3.2.2, and elsewhere. Some examples include a second executable code 1310 to perform an evaluation of a steady state temperature of the tool based on the tool structure data, the one or more parameters, and the actual specific heat of the tool. The first executable code can be a plug-in configured to work with the second executable code.

Hardware and Operating Environment

This section provides an overview of example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C.

The software components may communicate using a number of mechanisms well known to those skilled in the art, such as application program interfaces or inter-process communication techniques, including remote procedure calls. Computer storage includes random access memory (RAM), read only memory (ROM), erasable programmable read only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The teachings of various embodiments are not limited to any particular programming language or environment. Thus, other embodiments may be realized, as discussed regarding FIG. 14.

The present subject matter includes an embodiment in the form of a computing device that includes a bus with a processor and memory coupled thereto. This embodiment further includes one or more instruction sets stored in the memory and executable by the processor to evaluate a steady state temperature of the tool based on the tool structure data and the one or more parameters, the evaluation additionally based on a modified specific heat of the tool that is lower than an actual specific heat of the tool.

Figure 14:
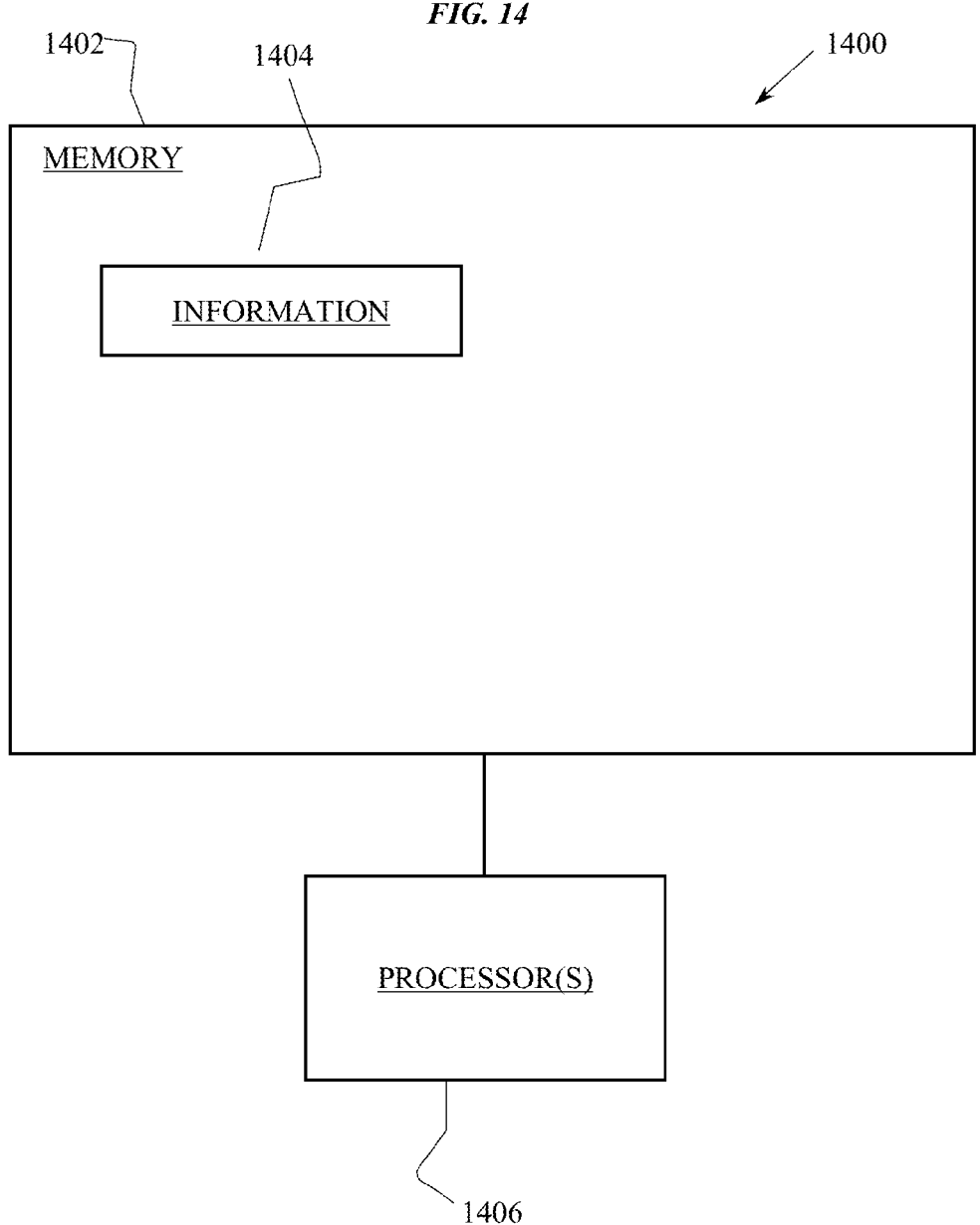
FIG. 14 illustrates a block diagram of an article in accordance with an embodiment of the present invention.
Figure 15A:
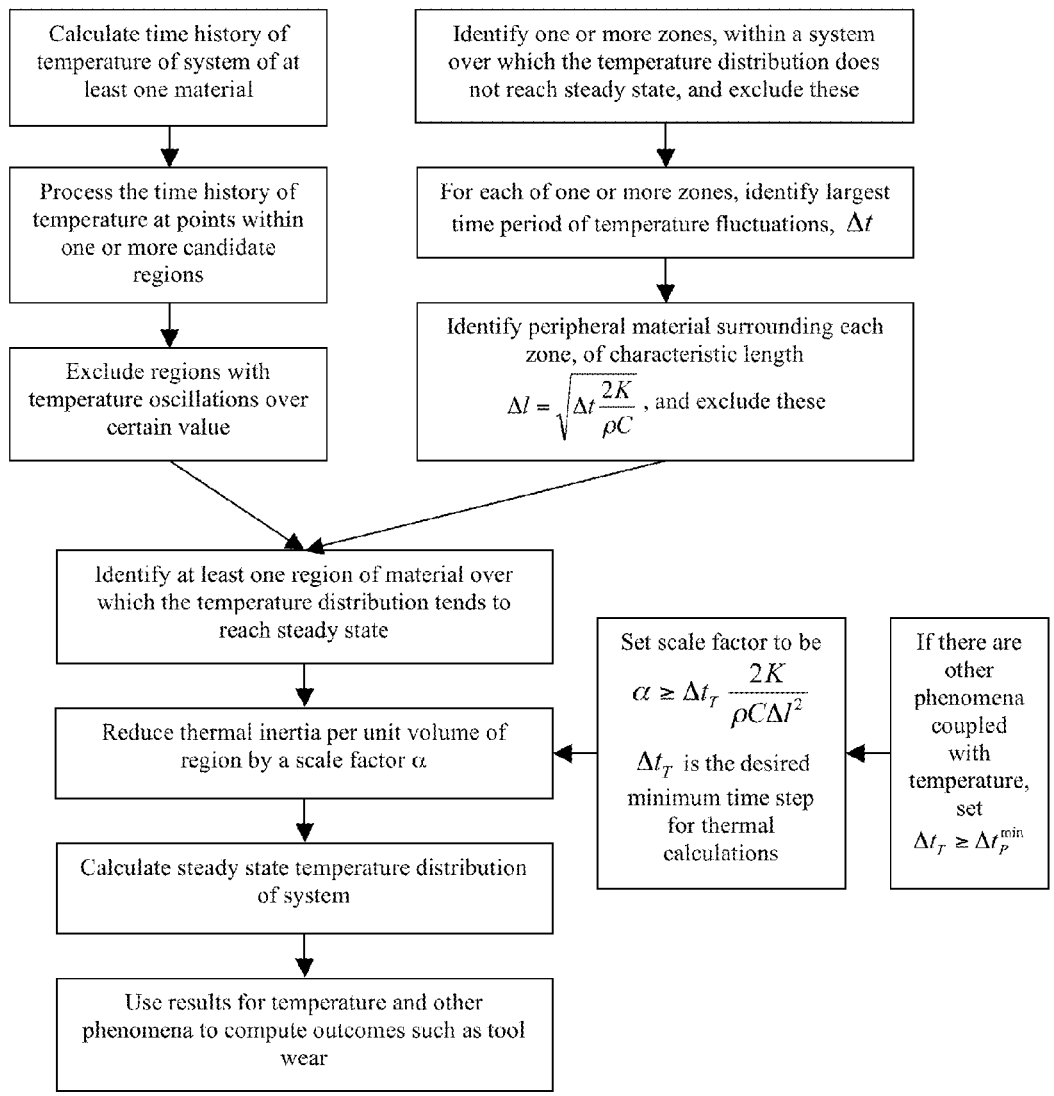
FIG. 15A illustrates a flowchart showing a method of calculating steady state temperature distribution of a system, in accordance with an embodiment of the present invention.
Figure 15B:
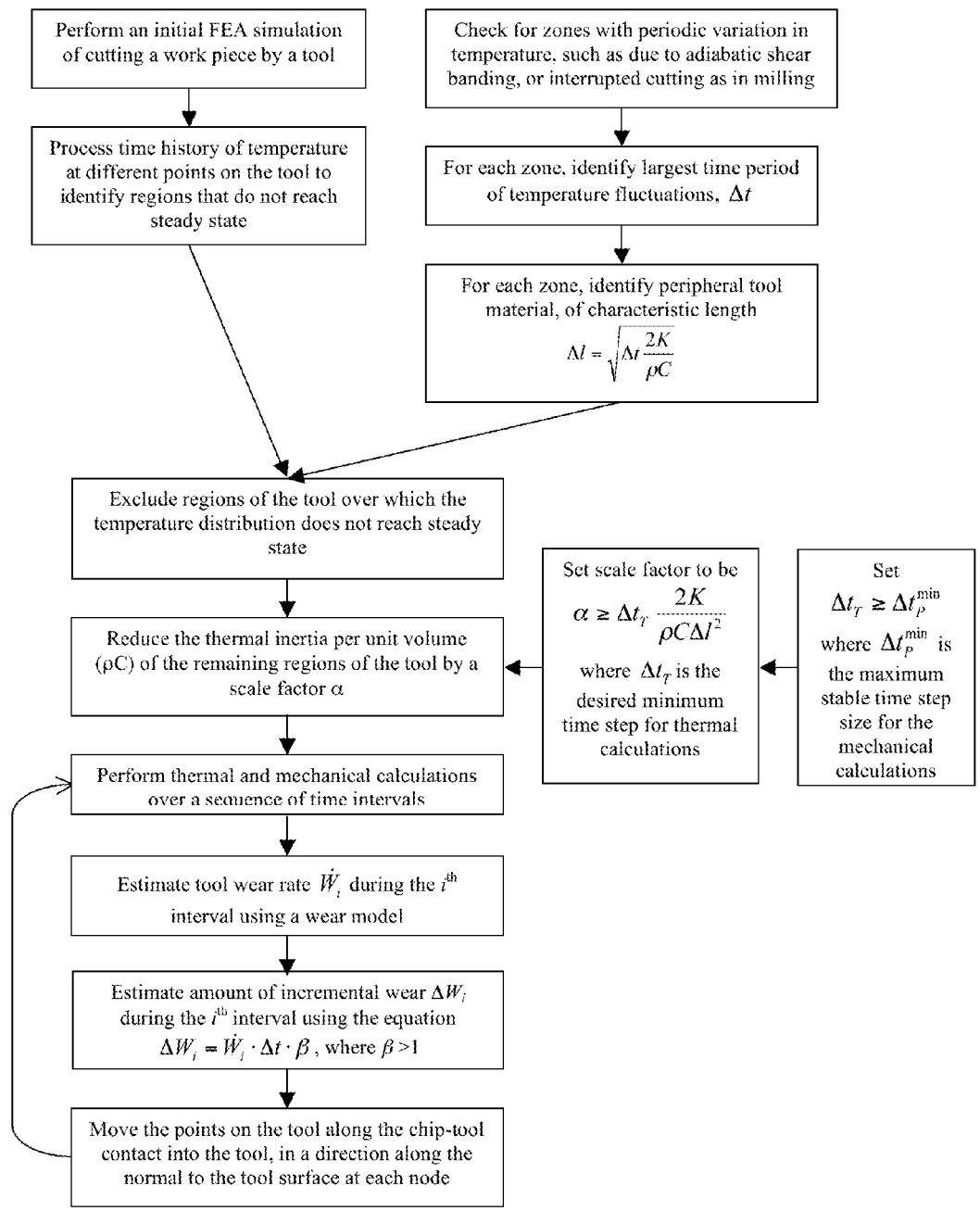
FIG. 15B illustrates a flowchart showing a method of calculating steady state temperature distribution of a tool and its wear over time, in accordance with yet another embodiment of the present invention.

FIG. 14 is a block diagram of an article 1400 according to various embodiments of the invention. Such embodiments may comprise a computer, a memory system, a magnetic or optical disk, some other storage device, or any type of electronic device or system. The article 1400 may include one or more processor(s) 1406 coupled to a machine-accessible medium such as a memory 1402 (e.g., a memory including electrical, optical, or electromagnetic elements). The medium may contain associated information 1404 (e.g., computer program instructions, data, or both) which, when accessed, results in a machine (e.g., the processor(s) 1406) performing the activities previously described herein.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A computerized method of displaying steady state temperature distribution of a system consisting of at least one material, comprising:
    identifying at least one region in at least one of said at least one material, said step of identifying further comprising: excluding one or more zones over which distribution of temperature does not reach steady state; and identifying and excluding peripheral material intervening between each of the one or more zones and said at least one region;
    reducing thermal inertia per unit volume in said at least one region by a scale factor with respect to an original value;
    calculating, by a processor, a steady state temperature distribution of said at least one region using reduced thermal inertia per unit volume; and
    displaying said steady state temperature distribution on a display device,
    wherein the step of calculating said steady state temperature distribution by the processor is achieved faster than without reduction of said thermal inertia per unit volume,
    wherein the thermal inertia per unit volume is a multiplicative product of density and specific heat of the at least one material,
    wherein said at least one region is subject to thermal transients that evolve over time to result in said steady state temperature distribution,
    wherein the identified at least one region does not comprise all regions of each of said at least one material,
    wherein the system is a mathematical model of a physical system used for calculating temperature distribution of the physical system,
    wherein characteristic length $\Delta l$ of the peripheral material corresponding to each of the one or more zones is estimated using equation $$\Delta l = \sqrt{\Delta t \frac{2K}{\rho C}},$$

and
    wherein $\Delta t$ is time period of temperature fluctuations in the one or more zones corresponding to the peripheral material and K, $\rho$ and C are thermal conductivity, density and specific heat of the peripheral material at their respective original values.

2. The method of claim 1, wherein the step of reducing thermal inertia per unit volume further comprises: reducing specific heat of the at least one material.

3. The method of claim 2, wherein the specific heat of the at least one material is reduced to different fractions of an original value in different sub-regions of said at least one region,
    wherein the scale factor used for each of said different sub-regions depends on characteristic length $\Delta l$ of a given amount of material over which temperature is determined, and the scale factor $\alpha$ is estimated using equation $$\alpha = \Delta t_T \frac{2K}{\rho C \Delta l^2},$$

and
    wherein $\Delta t_T$ is a desired value of thermal time step size to be taken for thermal calculations and K, $\rho$ and C are thermal properties of the at least one material at their respective original values.

4. The method of claim 3, wherein the scale factor is automatically calculated for each of the different sub-regions of said at least one region.

5. The method of claim 1, wherein the step of reducing thermal inertia per unit volume further comprises: reducing density of the at least one material.

6. The method of claim 5, wherein the density of the at least one material is reduced to different fractions of an original value in different sub-regions of said at least one region,
    wherein the scale factor used for each of said different sub-regions depends on characteristic length $\Delta l$ of a given amount of material over which temperature is determined, and the scale factor $\alpha$ is estimated using equation $$\alpha = \Delta t_T \frac{2K}{\rho C \Delta l^2},$$

and
    wherein $\Delta t_T$ is a desired value of thermal time step size to be taken for thermal calculations and K, $\rho$ and C are thermal properties of the at least one material at their respective original values.

7. The method of claim 6, wherein calculation of the steady state temperature distribution is performed using one of finite element, finite difference, or finite volume method.

8. The method of claim 1, wherein at least one of said at least one material is subject to at least one phenomenon coupled with temperature that results in boundary conditions that change depending on temperature.

9. The method of claim 1, wherein original thermal properties of at least one of said at least one material depend on temperature.

10. A computerized method of displaying steady state temperature distribution of a system consisting of at least one material, comprising:
    identifying at least one region in at least one of said at least one material;
    reducing thermal inertia per unit volume in said at least one region by a scale factor with respect to an original value;

calculating, by a processor, a steady state temperature distribution of said at least one region using reduced thermal inertia per unit volume;

calculating at least one physical phenomenon using said steady state temperature distribution; and displaying said steady state temperature distribution on a display device, wherein the step of calculating said steady state temperature distribution by the processor is achieved faster than without reduction of said thermal inertia per unit volume, wherein the thermal inertia per unit volume is a multiplicative product of density and specific heat of the at least one material, wherein said at least one region is subject to thermal transients that evolve over time to result in said steady state temperature distribution, wherein the identified at least one region does not comprise all regions of each of said at least one material, wherein the scale factor is estimated for each element within said at least one region using equation $$\alpha = \Delta t_T \frac{2K}{\rho C \Delta l^2},$$

wherein $\Delta l$ is a characteristic length of each element, and wherein $\Delta t_T$ is a desired value of thermal time step size to be taken for thermal calculations and K, $\rho$ and C are thermal properties of the at least one material at their respective original values.

11. The method of claim 10, wherein at least one of said at least one material is subject to said at least one physical phenomenon coupled with temperature that results in sources of heat that change depending on temperature.

12. The method of claim 11, wherein the thermal inertia per unit volume is reduced to a fraction of an original value, and the scale factor is greater than a minimum value.

13. The method of claim 12, wherein said desired value of thermal time step size $\Delta t_T$ is greater than a maximum allowed time step size $\Delta t_P$ that is used for calculation of said at least one physical phenomenon.

14. The method of claim 11, wherein said at least one physical phenomenon coupled with temperature is flow of electrical current associated with design of an integrated circuit.

15. The method of claim 11, wherein said at least one physical phenomenon coupled with temperature is flow of a fluid over one or more solids associated with design of aerodynamic structures.

16. The method of claim 11, wherein said at least one physical phenomenon coupled with temperature is microstructural change associated with processing of materials.

17. The method of claim 11, wherein said at least one physical phenomenon coupled with temperature is phase change associated with processing of materials.

18. The method of claim 11, wherein said at least one physical phenomenon coupled with temperature is mechanical deformation associated with processing of materials.

19. A computerized method of predicting mechanical deformation of at least one material by one or more tools, comprising:

holding, in a memory device communicatively to a processor, an instruction set executable on the processor to create and maintain, in the memory device, a mathematical model of the at least one material and the one or more tools to calculate mechanical deformation of the at least one material;

identifying at least one region in at least one of said one or more tools;

reducing thermal inertial per unit volume in said at least one region by a scale factor with respect to an original value;

calculating, by the processor, a steady state temperature distribution of said at least one region using reduced thermal inertial per unit volume;

using said steady state temperature distribution to calculate temperature distribution and said mechanical deformation of said at least one material; and displaying said mechanical deformation of said at least one material on a display device, wherein the step of calculating said steady state temperature distribution by the processor is achieved faster than without reduction of said thermal inertia per unit volume, wherein the thermal inertia per unit volume is a multiplicative product of density and specific heat of the one or more tools, wherein said at least one region is subject to thermal transients that evolve over time to result in said steady state temperature distribution, wherein the identified at least one region does not comprise all regions of each of said one or more tools, wherein the scale factor $\alpha$ is estimated for each element within said at least one region using equation $$\alpha = \Delta t_T \frac{2K}{\rho C \Delta l^2},$$

wherein $\Delta l$ is a characteristic length of each element, wherein $\Delta t_T$ is a desired value of thermal time step size to be taken for thermal calculations and K, $\rho$ and C are thermal properties of the at least one region at their respective original values, and wherein mechanical deformation of said at least one material by said one or more tools results in sources of heat that change depending on temperature of said at least one material.

20. The method of claim 19, wherein the thermal inertia per unit volume in said at least one region of said one or more tools is reduced to a fraction of the original value, and the scale factor is greater than a minimum value.

21. The method of claim 20, wherein said minimum value of the scale factor is such that time step size $\Delta t_T$ is greater than a maximum allowed time step size to calculate mechanical deformation, and wherein $$\Delta t_T = \alpha \frac{\rho C}{2K} \Delta l^2,$$

$\Delta l$ being a characteristic length of a given amount of material over which temperature is calculated and K, $\rho$ and C are thermal properties of the at least one region at their respective original values.

22. The method of claim 19, wherein the mechanical deformation of said at least one material is caused by cutting of at least one work piece using at least one of said one or more tools, each of said one or more tools having one or more cutting edges causing removal of one or more chips off of the at least one work piece.

23. The method of claim 22, wherein the cutting is lathe turning of the at least one work piece producing continuous chips.

24. The method of claim 22, wherein the cutting is lathe turning of the at least one work piece producing shear banded chips,
   wherein the thermal inertia per unit volume of the one or more tools is reduced in regions apart from the chips, and
   wherein zone size of the one or more tools adjacent to contact between the one or more tools and the chips that is not at steady state is estimated based on magnitude of thermal oscillations.

25. The method of claim 22, wherein the cutting is lathe turning of the at least one work piece producing shear banded chips,
   wherein the thermal inertia per unit volume of the one or more tools is reduced in regions apart from the chips, and
   wherein characteristic length $\Delta l$ of tool zone adjacent to contact between the one or more tools and the chips that is not at steady state and in which the thermal inertia per unit volume remains unchanged at the original value is estimated using equation $$\Delta l = \sqrt{\Delta t \frac{2K}{\rho C}},$$

with $\Delta t$ being time period between adiabatic shear bands of the chips, and $K$, $\rho$ and $C$ are thermal properties of the tool zone at their respective original values.

26. The method of claim 22, wherein the cutting is end milling,
   wherein thermal inertia per unit volume of the one or more tools is reduced in regions apart from the chips, and
   wherein tool zone size adjacent to contact between the one or more tools and the chips that is not at steady state and in which the thermal inertia per unit volume remains unchanged at the original value is automatically estimated based on magnitude of thermal oscillations.

27. The method of claim 22, wherein the cutting is end milling,
   wherein thermal inertia per unit volume of the one or more tools is reduced in regions apart from the chips, and
   wherein characteristic length $\Delta l$ of tool zone adjacent to contact between the one or more tools and the chips that is not at steady state and in which the thermal inertia per unit volume remains unchanged at the original value is estimated using equation $$\Delta l = \sqrt{\Delta t \frac{2K}{\rho C}},$$

with $\Delta t$ being time period between cuts with same cutting edge and thermal properties of the tool zone $K$, $\rho$ and $C$ being unchanged at their respective original values.

28. The method of claim 22, wherein at least one of the one or more tools has at least one tool coating applied over it.

29. The method of claim 22, wherein convection of heat into at least one fluid medium surrounding said at least one of the tools or the at least one work piece is calculated as part of thermal calculations.

30. A computerized method of modeling wear of one or more tools cutting at least one work material comprising:
   holding, in a memory device communicatively to a processor, an instruction set executable on the processor to create and maintain, in the memory device, a mathematical model of the at least one work material and the one or more tools to calculate mechanical deformation and temperature distribution of each of the at least one work material and the one or more tools;
   performing thermal and mechanical calculations over each of a sequence of time intervals, said time intervals being one of a group consisting of preset or automatically determined values;
   modeling mechanical deformation of the at least one work material due to cutting by the one or more tools during an $i^{th}$ time interval $\Delta t_i$;
   identifying at least one region in at least one of said one or more tools;
   reducing thermal inertia per unit volume in said at least one region by a scale factor with respect to an original value;
   calculating temperature distribution of the one or more tools and the at least one work material during the $i^{th}$ time interval;
   estimating during the $i^{th}$ time interval wear rate $\dot{W}_i$ of points of at least one of said one or more tools in contact with the at least one work material using one or more wear models for which results of the thermal and mechanical calculations during the interval are inputs;
   estimating amount of incremental wear $\Delta W_i$ at each of said points during the $i^{th}$ time interval as a multiplicative product of wear rate, time interval and a numeric constant $\beta$ using equation $\Delta W_i = \dot{W}_i * \Delta t_i * \beta$, said $\beta$ being greater than 1.0;
   calculating updated tool geometry by moving at least one of said points into a body of the one or more tools, in a direction along a normal to tool surface by a distance equal to the incremental wear estimated for said points; and
   performing subsequent thermal and mechanical calculations for a next time interval with the updated tool geometry,
   wherein the identified at least one region does not comprise all regions of each of said one or more tools,
   wherein said at least one region is subject to thermal transients that evolve over time to result in a steady state temperature distribution,
   wherein said steady state temperature distribution of said at least one region is calculated, by the processor, using reduced thermal inertia per unit volume, wherein the calculating of said steady state temperature distribution by the processor is achieved faster than without reduction of said thermal inertia per unit volume,
   wherein the thermal inertia per unit volume is a multiplicative product of density and specific heat of the one or more tools,
   wherein scale factor $\alpha$ is estimated for each element within said at least one region using equation $$\alpha = \Delta t_T \frac{2K}{\rho C \Delta l^2},$$

wherein Δl is a characteristic length of each element, and wherein $\Delta t_T$ is a desired value of thermal time step size to be taken for thermal calculations and K, ρ and C are thermal properties of the at least one region at their respective original values.

31. The method of claim 30, wherein at least one of said one or more tools has at least one tool coating material applied over it.

32. The method of claim 30, further comprising: choosing the numeric constant β to permit a maximum incremental wear equal to a predetermined value over said points.

33. The method of claim 30, wherein said $i^{th}$ time interval $\Delta t_i$ is equal to time interval required to achieve steady state temperature over the updated tool geometry.

34. The method of claim 30, wherein said $i^{th}$ time interval $\Delta t_i$ is estimated using equation $$\Delta t_i \approx \alpha \frac{\rho C}{2K} \Delta l^2$$

with $\Delta l \geq L_c$, and wherein $L_c$ is contact length between said one or more tools and the at least one work material, and α is scale factor for the thermal inertia per unit volume.

35. The method of claim 30, wherein said $i^{th}$ time interval Δt is automatically determined by tracking time history of temperature of points of at least one of said one or more tools in contact with the at least one work material.

36. The method of claim 30, wherein said results of the mechanical and thermal calculations taken as inputs to the one or more wear models are at the end of the $i^{th}$ time interval.

37. The method of claim 30, wherein said results of the mechanical and thermal calculations taken as inputs to the one or more wear models are averages of said results during the $i^{th}$ time interval.

38. The method of claim 30, wherein said results of the mechanical and thermal calculations taken as inputs to the one or more wear models are weighted averages of said results during the $i^{th}$ time interval, with weighting determined by exponents of mechanical and thermal variables in the corresponding one or more wear models.

39. A computerized method of modeling wear of one or more tools cutting at least one work material, comprising:

holding, in a memory device communicatively to a processor, an instruction set executable on the processor to create and maintain, in the memory device, a mathematical model of the one or more tools and the at least one work material to calculate temperature distribution and mechanical deformation of each of the one or more tools and the at least one work material;

performing thermal and mechanical calculations over each of sequence of time intervals, said time intervals being one of a group consisting of preset or automatically determined values;

modeling said mechanical deformation of the at least one work material by the one or more tools during an $i^{th}$ time interval $\Delta t_i$;

identifying at least one region in said one or more tools that are spaced apart from a surface of the at least one work material by a minimum distance;

reducing thermal inertia per unit volume in said at least one region by a scale factor with respect to an original value;

calculating said temperature distribution and said mechanical deformation of said one or more tools and the at least one work material during the $i^{th}$ time interval;

estimating during the $i^{th}$ time interval wear rate $\dot{W}_i$ of points of at least one of said one or more tools in contact with the at least one work material, using one or more wear models for which the temperature distribution and the mechanical deformation during the $i^{th}$ time interval are inputs;

estimating amount of incremental wear $\Delta W_i$ at each of said points during the $i^{th}$ time interval as a multiplicative product of wear rate, time interval and a numeric constant β using equation $\Delta W_i = \dot{W}_i * \Delta t_i * \beta$, said numeric constant being greater than 1.0;

calculating updated tool geometry by moving at least one of said points into a body of the one or more tools, in a direction along a normal to tool surface by a distance equal to the incremental wear estimated for said points; and performing subsequent thermal and mechanical calculations for a next time interval with the updated tool geometry, wherein said at least one region is subject to thermal transients that evolve over time to result in a steady state temperature distribution, wherein the steady state temperature distribution of said at least one region is calculated, by the processor, using reduced thermal inertia per unit volume, wherein the calculating of said steady state temperature distribution by the processor is achieved faster than without reduction of said thermal inertia per unit volume, wherein the thermal inertia per unit volume is a multiplicative product of density and specific heat of the at least one work material, wherein the scale factor α is estimated for each element within said at least one region using equation $$\alpha = \Delta t_T \frac{2K}{\rho C \Delta l^2},$$

wherein Δl is a characteristic length of each element, and wherein $\Delta t_T$ is a desired value of thermal time step size to be taken for thermal calculations and K, ρ and C are thermal properties of the at least one region at their respective original values.

40. The method of claim 39, wherein the minimum distance Δd is estimated using equation $$\Delta d = \sqrt{\Delta t \frac{2K}{\rho C}},$$

with Δt being time period at which adiabatic shear bands periodically form in the at least one work material and K, ρ and C are thermal properties of said one or more tools at their respective original values.

41. The method of claim 39, wherein the minimum distance Δd is estimated using equation $$\Delta d = \sqrt{\Delta t \frac{2K}{\rho C}},$$

with Δt being time period between cuts with same cutting tool and K, ρ and C are thermal properties of said one or more tools at their respective original values.

* * * * *